(12) United States Patent
Wang et al.

(10) Patent No.: US 12,490,197 B2
(45) Date of Patent: Dec. 2, 2025

(54) SIDELINK POWER CONTROL WITH UNIFIED TRANSMISSION CONFIGURATION INDICATORS

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 455 days.

(21) Appl. No.: 18/183,327

(22) Filed: Mar. 14, 2023

(65) Prior Publication Data

US 2024/0314697 A1   Sep. 19, 2024

(51) Int. Cl.
*H04W 4/40* (2018.01)
*H04W 52/14* (2009.01)
*H04W 52/24* (2009.01)
*H04W 52/36* (2009.01)

(52) U.S. Cl.
CPC ......... *H04W 52/14* (2013.01); *H04W 52/242* (2013.01); *H04W 52/367* (2013.01)

(58) Field of Classification Search
CPC .......... H04W 4/40; H04W 4/46; H04W 4/44; H04W 52/38; H04W 52/36; H04W 52/10; H04W 52/54
See application file for complete search history.

(56) References Cited

U.S. PATENT DOCUMENTS

2022/0159583 A1   5/2022  Wang et al.
2022/0377720 A1*  11/2022  Park ..................... H04W 52/242

OTHER PUBLICATIONS

International Search Report and Written Opinion—PCT/US2024/017087—ISA/EPO—Jun. 11, 2024 (2301930WO).

* cited by examiner

*Primary Examiner* — Tu X Nguyen
(74) *Attorney, Agent, or Firm* — Holland & Hart LLP

(57) ABSTRACT

Methods, systems, and devices for wireless communication are described. A first user equipment (UE) may select a sidelink beam for a second UE configured to be connected to the first UE based on a sidelink transmission configuration indicator (TCI). The sidelink TCI may include a sidelink pathloss reference signal identifier, or a sidelink power control identifier, or both. The first UE may transmit a sidelink pathloss reference signal to the second UE configured to be connected to the first UE. The sidelink pathloss reference signal may be associated with the sidelink pathloss reference signal identifier of the sidelink TCI.

30 Claims, 10 Drawing Sheets

SIDELINK POWER CONTROL WITH UNIFIED TRANSMISSION CONFIGURATION INDICATORS

FIELD OF TECHNOLOGY

The following relates to wireless communication, including sidelink power control with unified transmission configuration indicators (TCIs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support sidelink power control with unified TCIs. A UE may select a sidelink beam for another UE configured to be connected to the UE based on a sidelink TCI (e.g., a sidelink shared joint TCI or a sidelink shared separate reverse link TCI). In some examples, the TCI may include a sidelink TCI state identifier, a quasi-colocation (QCL) information type, a sidelink pathloss reference signal identifier, a sidelink power control identifier, or the like. In some cases, the UE may measure a set of sidelink power control parameters and indicate the set of sidelink power control parameters to the other UE. In some examples, the set of sidelink power control parameters may be associated with the sidelink TCI according to a sidelink radio resource control (RRC) configuration or a medium access control (MAC) control element (MAC-CE). In such cases, the other UE may determine a transmit power value for a sidelink beam according to the sidelink power control parameters associated with the sidelink TCI.

A method for wireless communication at a first device is described. The method may include selecting a sidelink beam for a second device configured to be connected to the first device based on a sidelink TCI, where the sidelink TCI includes a sidelink pathloss reference signal identifier, or a sidelink power control identifier, or both, and transmitting a sidelink pathloss reference signal to the second device configured to be connected to the first device, where the sidelink pathloss reference signal is associated with the sidelink pathloss reference signal identifier of the sidelink TCI.

An apparatus for wireless communication at a first device is described. The apparatus may include a processor, memory coupled with the processor, and instructions stored in the memory. The instructions may be executable by the processor to cause the apparatus to select a sidelink beam for a second device configured to be connected to the first device based on a sidelink TCI, where the sidelink TCI includes a sidelink pathloss reference signal identifier, or a sidelink power control identifier, or both, and transmit a sidelink pathloss reference signal to the second device configured to be connected to the first device, where the sidelink pathloss reference signal is associated with the sidelink pathloss reference signal identifier of the sidelink TCI.

Another apparatus for wireless communication at a first device is described. The apparatus may include means for selecting a sidelink beam for a second device configured to be connected to the first device based on a sidelink TCI, where the sidelink TCI includes a sidelink pathloss reference signal identifier, or a sidelink power control identifier, or both, and means for transmitting a sidelink pathloss reference signal to the second device configured to be connected to the first device, where the sidelink pathloss reference signal is associated with the sidelink pathloss reference signal identifier of the sidelink TCI.

A non-transitory computer-readable medium storing code for wireless communication at a first device is described. The code may include instructions executable by a processor to select a sidelink beam for a second device configured to be connected to the first device based on a sidelink TCI, where the sidelink TCI includes a sidelink pathloss reference signal identifier, or a sidelink power control identifier, or both, and transmit a sidelink pathloss reference signal to the second device configured to be connected to the first device, where the sidelink pathloss reference signal is associated with the sidelink pathloss reference signal identifier of the sidelink TCI.

Some examples of the method, apparatuses, and non-transitory computer-readable medium described herein may further include operations, features, means, or instructions for transmitting control signaling including the sidelink TCI and a sidelink power control, where the sidelink power control includes the sidelink power control identifier and a set of sidelink power control parameters.

Some examples of the method, apparatuses, and non-transitory computer-readable medium described herein may further include operations, features, means, or instructions for transmitting a sidelink radio resource control (RRC) message including one or both of the sidelink TCI and the sidelink power control.

Some examples of the method, apparatuses, and non-transitory computer-readable medium described herein may further include operations, features, means, or instructions for transmitting a sidelink medium access control-control element (MAC-CE) including one or both of the sidelink TCI and the sidelink power control.

Some examples of the method, apparatuses, and non-transitory computer-readable medium described herein may further include operations, features, means, or instructions for transmitting to the second device configured to be connected to the first device the sidelink pathloss reference signal may be based on a transmit power value for the sidelink pathloss reference signal.

Some examples of the method, apparatuses, and non-transitory computer-readable medium described herein may further include operations, features, means, or instructions for transmitting an indication of the transmit power value for the sidelink pathloss reference signal.

In some examples of the method, apparatuses, and non-transitory computer-readable medium described herein, transmitting the indication of the transmit power value for the sidelink pathloss reference signal may include operations, features, means, or instructions for transmitting a sidelink control information (SCI) indicating the transmit power value for the sidelink pathloss reference signal.

Some examples of the method, apparatuses, and non-transitory computer-readable medium described herein may further include operations, features, means, or instructions for transmitting SCI from the first device configured to be connected to the second device, where the sidelink TCI and a sidelink power control may be based on a TCI codepoint associated with the SCI.

In some examples of the method, apparatuses, and non-transitory computer-readable medium described herein, a quantity of sidelink TCI states selectable in accordance with the TCI codepoint associated with the SCI may be based on a sidelink RRC configuration.

In some examples of the method, apparatuses, and non-transitory computer-readable medium described herein, the sidelink TCI includes a set of sidelink power control identifiers and a sidelink power control includes a set of sidelink power control identifiers, each of one or more sidelink power control identifiers of the set of sidelink power control identifiers may be associated with a set of sidelink power control parameters.

Some examples of the method, apparatuses, and non-transitory computer-readable medium described herein may further include operations, features, means, or instructions for selecting the sidelink power control identifier and the set of sidelink power control parameters based on a sidelink MAC-CE or SCI, or both.

In some examples of the method, apparatuses, and non-transitory computer-readable medium described herein, the sidelink MAC-CE may be irrespective of the sidelink pathloss reference signal identifier.

Some examples of the method, apparatuses, and non-transitory computer-readable medium described herein may further include operations, features, means, or instructions for associating each of one or more sidelink pathloss reference signal identifiers or each of one or more sidelink power control identifiers with the sidelink TCI based on a sidelink MAC-CE.

In some examples of the method, apparatuses, and non-transitory computer-readable medium described herein, the sidelink TCI may include a sidelink TCI state identifier, or a QCL type, or both.

In some examples of the method, apparatuses, and non-transitory computer-readable medium described herein, the sidelink TCI may be applicable to a forward link between the first device and the second device or a reverse link between the second device and the first device, or both and the sidelink TCI may be applicable to one or more of a physical sidelink control channel (PSCCH), a physical sidelink shared channel (PSSCH), or a physical sidelink feedback channel (PSFCH).

A method for wireless communication at a first device is described. The method may include receiving a sidelink pathloss reference signal from a second device configured to be connected to the first device, associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters, determining a transmit power value for a sidelink beam of the first device based on the associating, and performing sidelink communication on the sidelink beam in accordance with the transmit power value for the sidelink beam.

An apparatus for wireless communication at a first device is described. The apparatus may include a processor, memory coupled with the processor, and instructions stored in the memory. The instructions may be executable by the processor to cause the apparatus to receive a sidelink pathloss reference signal from a second device configured to be connected to the first device, associate the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters, determine a transmit power value for a sidelink beam of the first device based on the associating, and perform sidelink communication on the sidelink beam in accordance with the transmit power value for the sidelink beam.

Another apparatus for wireless communication at a first device is described. The apparatus may include means for receiving a sidelink pathloss reference signal from a second device configured to be connected to the first device, means for associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters, means for determining a transmit power value for a sidelink beam of the first device based on the associating, and means for performing sidelink communication on the sidelink beam in accordance with the transmit power value for the sidelink beam.

A non-transitory computer-readable medium storing code for wireless communication at a first device is described. The code may include instructions executable by a processor to receive a sidelink pathloss reference signal from a second device configured to be connected to the first device, associate the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters, determine a transmit power value for a sidelink beam of the first device based on the associating, and perform sidelink communication on the sidelink beam in accordance with the transmit power value for the sidelink beam.

Some examples of the method, apparatuses, and non-transitory computer-readable medium described herein may further include operations, features, means, or instructions for receiving control signaling including one or both of the sidelink TCI or the sidelink power control.

In some examples of the method, apparatuses, and non-transitory computer-readable medium described herein, receiving the control signaling may include operations, features, means, or instructions for receiving a sidelink RRC message including one or both of the sidelink TCI and the sidelink power control.

In some examples of the method, apparatuses, and non-transitory computer-readable medium described herein, receiving the control signaling may include operations, features, means, or instructions for receiving a sidelink MAC-CE including one or both of the sidelink TCI and the sidelink power control.

Some examples of the method, apparatuses, and non-transitory computer-readable medium described herein may further include operations, features, means, or instructions for receiving the sidelink pathloss reference signal from the second device configured to be connected to the first device may be based on a transmit power value for the sidelink pathloss reference signal.

Some examples of the method, apparatuses, and non-transitory computer-readable medium described herein may further include operations, features, means, or instructions for receiving an indication of the transmit power value for the sidelink pathloss reference signal.

In some examples of the method, apparatuses, and non-transitory computer-readable medium described herein, receiving the indication of the transmit power value for the sidelink pathloss reference signal may include operations, features, means, or instructions for receiving SCI indicating the transmit power value for the sidelink pathloss reference signal.

Some examples of the method, apparatuses, and non-transitory computer-readable medium described herein may further include operations, features, means, or instructions for receiving SCI from the second device configured to be connected to the first device, where the sidelink TCI and the sidelink power control may be based on a TCI codepoint associated with the SCI.

In some examples of the method, apparatuses, and non-transitory computer-readable medium described herein, a quantity of sidelink TCI states selectable in accordance with the TCI codepoint associated with the SCI may be based on a sidelink RRC configuration.

In some examples of the method, apparatuses, and non-transitory computer-readable medium described herein, the sidelink TCI includes a set of sidelink power control identifiers and the sidelink power control includes the set of sidelink power control identifiers, and each of one or more sidelink power control identifiers of the set of sidelink power control identifiers may be associated with a respective set of sidelink power control parameters.

In some examples of the method, apparatuses, and non-transitory computer-readable medium described herein, the sidelink power control identifier and the set of sidelink power control parameters may be based on a sidelink MAC-CE or SCI, or both.

Some examples of the method, apparatuses, and non-transitory computer-readable medium described herein may further include operations, features, means, or instructions for associating each of one or more sidelink pathloss reference signal identifiers or each of one or more sidelink power control identifiers with the sidelink TCI based on a sidelink MAC-CE.

In some examples of the method, apparatuses, and non-transitory computer-readable medium described herein, the sidelink MAC-CE may be irrespective of the sidelink pathloss reference signal identifier.

In some examples of the method, apparatuses, and non-transitory computer-readable medium described herein, the sidelink TCI may be applicable to a forward link between the first device and the second device or a reverse link between the second device and the first device, or both and the sidelink TCI may be applicable to one or more of a PSCCH, a PSSCH, or a PSFCH.

DETAILED DESCRIPTION

A communication device, such as a UE may support wireless communication, including sidelink communication (e.g., sidelink transmission, sidelink reception). In some cases, sidelink communication may occur over a sidelink communication channel, for example, between UEs. In some cases, a UE may support power control for wireless communication, including sidelink communication. For example, the UE may determine (e.g., calculate, ascertain, or identify) a transmit power value for the sidelink communication based on power control parameters configured for the UE (e.g., by a network entity, such as a base station). Examples of power control parameters may include a bandwidth part (BWP), a carrier frequency, a serving cell, a configured output power for the carrier frequency of the serving cell, a pathloss for the BWP of the carrier frequency, etc. In some cases, the UE may support beam-based power control for sidelink communications (e.g., due to interference between sidelink transmission and sidelink reception on various sidelink beams). In some other cases, the UE may support power control according to a unified TCI. The UE may associate the power control parameters with the sidelink unified TCI such that the UE may set a transmit power parameter for another UE. In such cases, the wireless communications system may support high reliability and low latency communications for the other UE (e.g., when the other UE is out of coverage in the wireless communications system).

Various aspects of the present disclosure relate to enabling sidelink power control with unified TCIs. In some cases, a UE may select a sidelink beam for another UE configured to be connected to the UE based on a sidelink TCI (e.g., a sidelink shared joint TCI or a sidelink shared separate reverse link TCI). In some examples, the TCI may include a sidelink TCI state identifier, a QCL information type, a sidelink pathloss reference signal identifier, or a sidelink power control identifier. In some cases, the UE may measure a set of sidelink power control parameters and indicate the set of sidelink power control parameters to the other UE. In some examples, the set of sidelink power control parameters may be associated with the sidelink TCI according to a sidelink RRC configuration or a MAC-CE. In such cases, the other UE may determine a transmit power value for a sidelink beam according to the sidelink power control parameters associated with the sidelink TCI. Accordingly, the other UE may perform sidelink communications with high reliability and low latency (e.g., when the other UE is out of coverage, in a star topography, etc.).

Aspects of the disclosure are initially described in the context of wireless communications systems. Aspects of the disclosure are further illustrated by and described with reference to apparatus diagrams, system diagrams, and flowcharts that relate to sidelink power control with unified TCIs.

Figure 1:
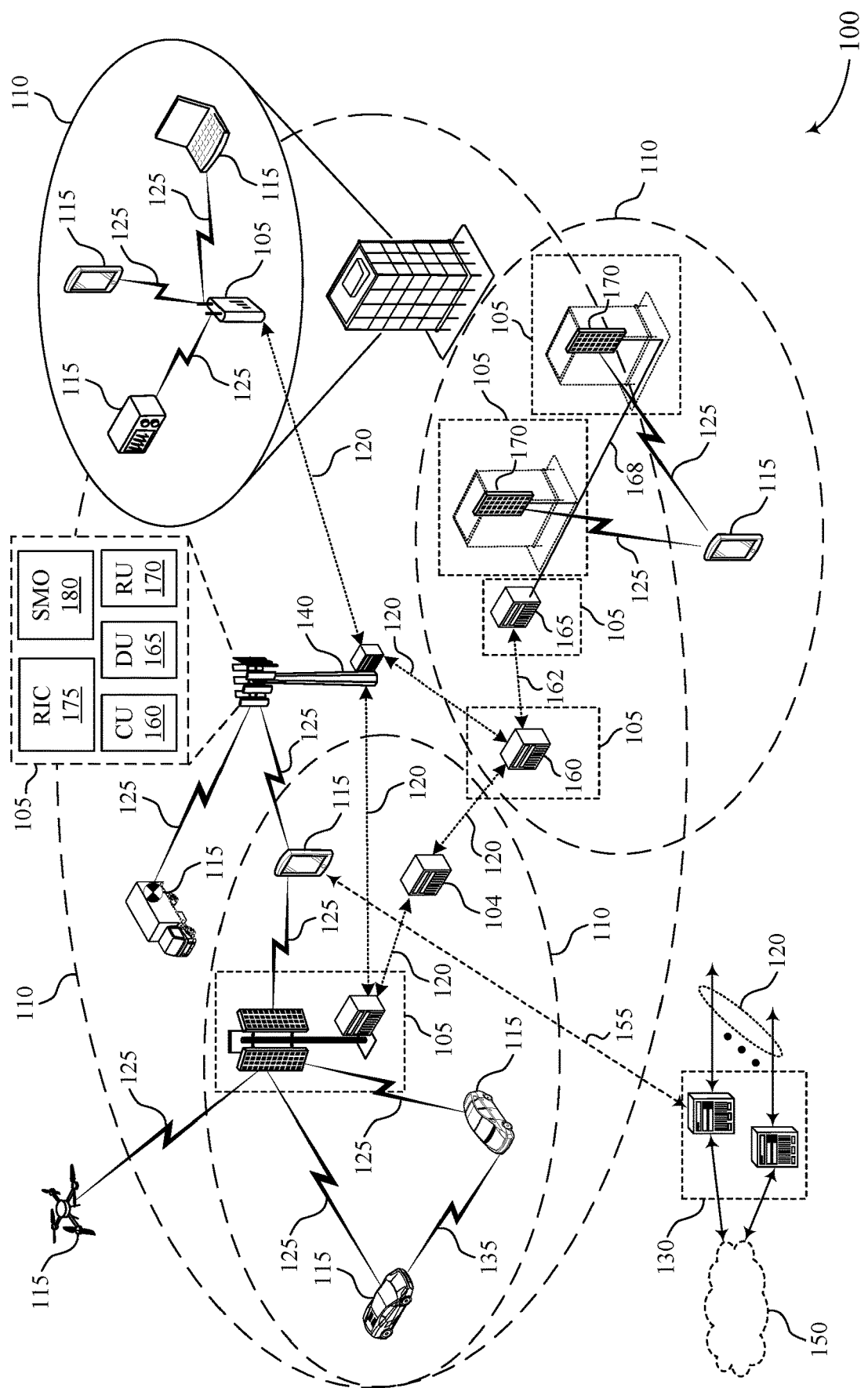
FIGS. 1 and 2 show examples of wireless communications systems that support sidelink power control with unified TCIs in accordance with one or more aspects of the present disclosure.

FIG. 1 shows an example of a wireless communications system 100 that supports sidelink power control with unified TCIs in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-NB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In the wireless communications system 100, infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sidelink power control with unified TCIs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In the wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support association between sidelink unified TCI and sidelink power control parameters. In the wireless communications system 100, a first UE 115 may select a sidelink beam for a second UE 115 configured to be connected to the first UE 115 based at least in part on a sidelink TCI. The sidelink TCI may include one or more of a sidelink TCI state identifier, a QCL information type, a sidelink pathloss reference signal identifier, or a sidelink power control identifier. The first UE 115 may transmit a sidelink pathloss reference signal to the second UE 115 configured to be connected to the first UE 115. The sidelink pathloss reference signal may be associated with the sidelink pathloss reference signal identifier of the sidelink TCI.

In some examples, the first UE 115 and the second UE 115 may support a forward link joint TCI state configuration, which may include a sidelink TCI state identifier (e.g., sl-tci-StateUnified-Id), a QCL type (e.g., qcl-type), a sidelink pathloss reference signal identifier (e.g., sl-pathlossReferenceRS-Id), and a sidelink power control identifier (e.g., sl-powerControl-Id). In some other examples, the first UE 115 and the second UE 115 may support a reverse link TCI state configuration, which may include a sidelink reverse link TCI state identifier (e.g., sl-rl-tci-State-Id), a QCL type (e.g., qcl-type), a sidelink pathloss reference signal identifier (e.g., sl-pathlossReferenceRS-Id), and a sidelink power control identifier (e.g., sl-powerControl-Id). In some examples, the first UE 115 and the second UE 115 may support a sidelink power control configuration (e.g., sl-powerControl), which may include one or more power control parameters, including a sidelink power control identifier (e.g., sl-powerControl-Id), a sidelink power control nominal power (e.g., sl-powerControl-p0), and a sidelink power control alpha parameter (e.g., sl-powerControl-alpha). In other examples, the forward link joint TCI state configuration and the reverse link TCI state configuration may include a list of sidelink power control parameters (e.g., sl-powerControl-list), which defines a set of sidelink power control identifiers (e.g., sl-powerControl-Id1, sl-powerControl-Id2, sl-powerControl-Id3, etc.).

In some examples, the first UE 115 may transmit control signaling including (e.g., carrying) the sidelink TCI and a sidelink power control. The sidelink power control may include the sidelink power control identifier and a set of sidelink power control parameters. In some examples, the first UE 115 may transmit a sidelink RRC message including one or both of the sidelink TCI and the sidelink power control. In some other examples, the first UE 115 may transmit a sidelink MAC-CE including one or both of the sidelink TCI and the sidelink power control. The sidelink TCI may be applicable to a forward link between the first UE 115 and the second UE 115 or a reverse link between the second UE 115 and the first UE 115, or both. The sidelink TCI may be applicable to one or more of a physical sidelink control channel (PSCCH), a physical sidelink shared channel (PSSCH), or a physical sidelink feedback channel (PSFCH).

Additionally, or alternatively, in the wireless communications system 100, a first UE 115 may receive a sidelink pathloss reference signal from a second UE 115 configured to be connected to the first UE 115. The first UE 115 may associate the sidelink pathloss reference signal to a sidelink TCI and a sidelink power control. The sidelink TCI may include one or more of a sidelink TCI state identifier, a QCL information type, a sidelink pathloss reference signal identifier, or a sidelink power control identifier. The sidelink power control may include the sidelink power control identifier and a set of sidelink power control parameters. The first UE 115 may determine a transmit power value for a sidelink beam of the first UE 115 based on the associating, and the first UE 115 may perform sidelink communication on the sidelink beam in accordance with the transmit power value for the sidelink beam.

Figure 2:
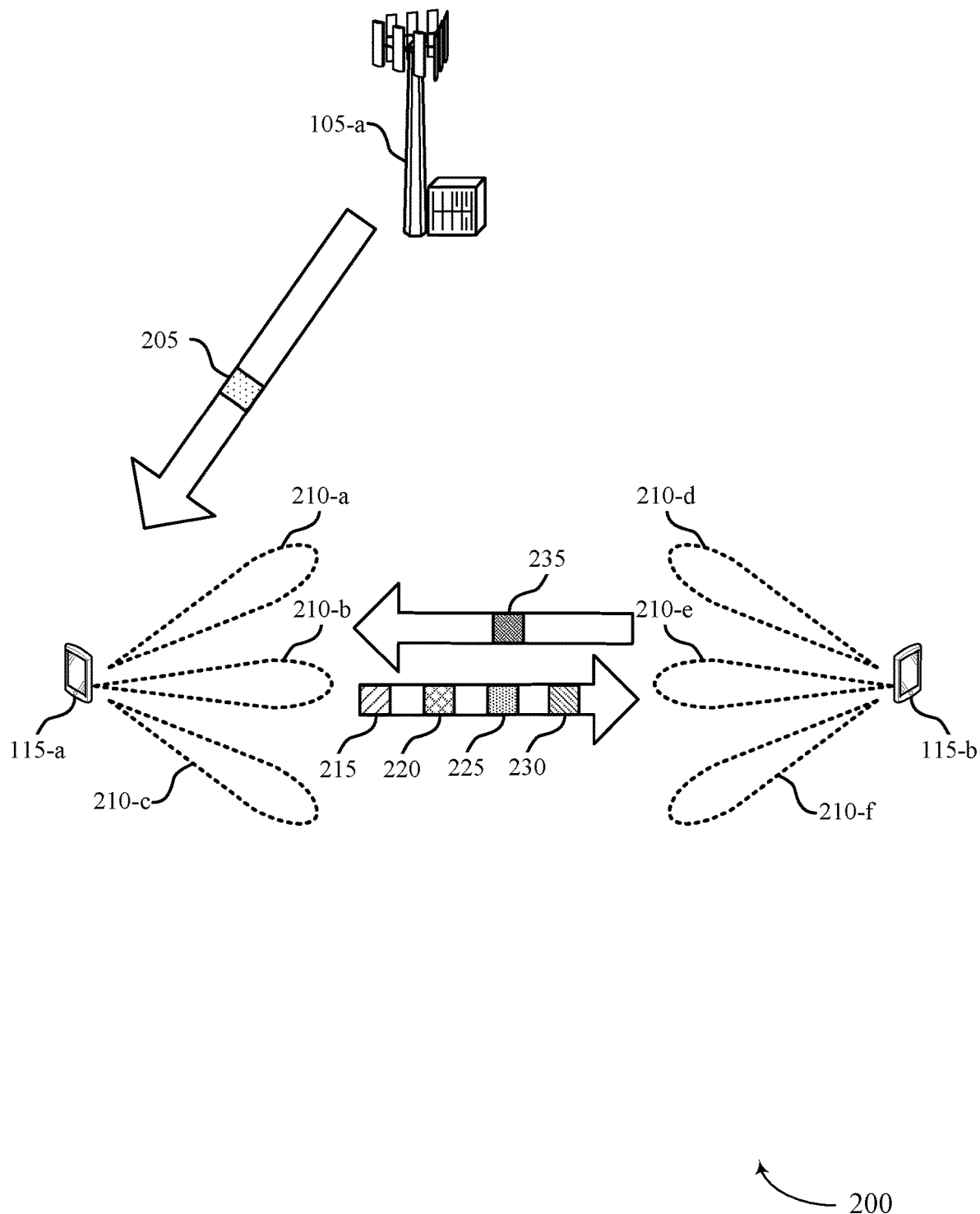

FIG. 2 illustrates an example of a wireless communications system 200 that supports sidelink power control with unified TCIs in accordance with one or more aspects of the present disclosure. In some examples, the wireless communications system 200 may implement or be implemented by aspects of the wireless communications system 100. For example, the wireless communications system 200 may include a network entity 105-*a*, a UE 115-*a*, and a UE 115-*b*, which may be examples of corresponding devices described herein, including with reference to FIG. 1. In some cases, the UE 115-*a* and the UE 115-*b* may support sidelink power control with unified TCI.

The wireless communications system 200 may support sidelink power control. For example, one or more of the network entity 105-*a*, the UE 115-*a*, or the UE 115-*b* may determine (e.g., calculate, ascertain, or identify) a transmit power for a sidelink transmission, such as a physical shared sidelink channel (PSSCH) transmission, based on a set of power control parameters (e.g., an average, a minimum, a maximum, etc. of values associated with the set of power parameters). In some cases, one or more of the network entity 105-*a*, the UE 115-*a*, or the UE 115-*b* may determine (e.g., calculate, ascertain, or identify) a first power value based on one or more downlink measurements (e.g., one or more downlink pathloss measurements) and one or more downlink power control parameters. In such examples, the one or more downlink measurements (e.g., one or more downlink pathloss measurements) may be based on one or more downlink pathloss reference signals.

In some cases, one or more of the network entity 105-*a*, the UE 115-*a*, or the UE 115-*b* may determine (e.g., calculate, ascertain, or identify) a second power value based on one or more sidelink measurements (e.g., one or more sidelink pathloss measurements) and one or more sidelink power control parameters. In such examples, the one or more sidelink measurements (e.g., one or more sidelink pathloss measurements) may be measured based on one or more sidelink pathloss reference signals. The downlink measurements, the downlink power control parameters, the sidelink measurements, and the sidelink power control parameters may be part of a sidelink resource pool.

One or more of the network entity 105-*a*, the UE 115-*a*, or the UE 115-*b* may determine or select a sidelink transmit power value based at least in part on the first power value, the second power value, or other power control values. For example, one or more of the network entity 105-*a*, the UE 115-*a*, or the UE 115-*b* may determine (e.g., calculate, ascertain, or identify) the sidelink transmit power value based at least in part on a minimum of the first power value and the second power value or the minimum of other power control values (e.g., a maximum power value, a maximum channel busy ration (CBR) power value, etc.). In some cases, one or more of the network entity 105-*a*, the UE 115-*a*, or the UE 115-*b* may scale a physical sidelink control channel (PSCCH) according to a physical sidelink shared channel (PSSCH) based on a ratio of resources (e.g., resource blocks (RBs)) used for the PSCCH and the PSSCH. In some examples, a physical sidelink feedback channel (PSFCH) power may be based on downlink power control parameters.

Additionally, or alternatively, the wireless communications systems 200 may support sidelink beam-based power control. For example, the UE 115-*a* may determine a sidelink transmit beam pair (e.g., a beam 210-*a* and a beam 210-*d*) different from an initial sidelink beam pair (e.g., a beam 210-*b* and a beam 210-*e*). In such examples, the sidelink transmit beam pair may be a refined beam pair. The beam 210-*a* may have different power control parameters (i.e., due to different interference in the uplink control channel, the sidelink control channel, or both) than the initial beam 210-*b*. In some cases, the network entity 105-*a* may determine these power control parameters. In such cases, the power control parameters may include a sidelink pathloss reference signal 230, a sidelink pathloss for power control, and other sidelink power control parameters. In some cases, the UE 115-*b* may report, to the UE 115-*a*, a reference signal received power (RSRP) associated with sidelink reference signals of different beams (e.g., the beam 210-*d*, the beam 210-*e*, a beam 210-*f*, or a combination thereof). In such cases, the UE 115-*a* determines a transmit power value according to the RSRP associated with sidelink reference signals of the different beams.

In the example of FIG. 2, the wireless communications system 200 may also support power control with unified TCIs for communications between the network entity 105-*a* and the UE 115-*a* (e.g., in Uu). For example, uplink power control may be set according to a joint TCI state. In such examples, the joint TCI state may include a unified TCI state identifier, a QCL type, a pathloss reference signal, or the like. The uplink TCI state may also include an uplink TCI state identifier, a serving cell identifier, a reference signal, additional power control information, a pathloss reference signal identifier, or the like. In such cases, the reference signal may include a synchronization signal block (SSB) index, a channel state information (CSI) index, sounding reference signal (SRS), or the like.

In some cases, the UE 115-*b* may be unable or not configured to determine the transmit power value for the UE 115-*a* for sidelink power control, sidelink beam based power control, and power control with unified TCI for communications between the network entity 105-*a* and the UE 115-*a*. In some cases, the UE 115-*a* or the UE 115-*b* may be out of coverage and use preconfigured sidelink power control parameters associated with different beams 210. In such cases, the preconfigured sidelink power control parameters may be insufficient to support adequate sidelink communications between the UE 115-*a* and the UE 115-*b*. In other examples, the UE 115-*b* (e.g., an anchor UE) may be associated with the UE 115-*a* in a star topology. Accordingly, techniques described herein may enable the UE 115-*b* to select a beam 210 (e.g., a sidelink beam) for the UE 115-*a* by performing sidelink power control with unified TCI.

For example, the UE 115-*a* may associate sidelink power control parameters with sidelink unified TCI in order to select a beam 210 for the UE 115-*b*. In such cases, the network entity 105-*a* may indicate, to the UE 115-*a*, a sidelink TCI 205. For example, the network entity 105-*a* may indicate a sidelink TCI 205 via sidelink control information (SCI) or a sidelink MAC-CE. In some cases, the UE 115-*a* may select the beam 210 of the UE 115-*b* according to the sidelink TCI 205. In such cases, the sidelink TCI 205 may be a sidelink shared joint TCI or sidelink shared separate reverse link TCI. For example, the sidelink TCI 205 may be applicable to a forward link between the UE 115-*b* and the UE 115-*a* or a reverse link between the UE 115-*a* and the UE 115-*b*, or both. Further, the sidelink TCI 205 may be applicable to one or more of the PSCCH, the PSSCH, or the PSFCH.

In some cases, the sidelink pathloss reference signal 230 and sidelink power control parameters may be associated with the TCI states according to a sidelink RRC configuration or a sidelink MAC-CE. In some cases, the UE 115-*b* may measure the pathloss according to the sidelink pathloss reference signal 230 from the UE 115-*a*. In such cases, the UE 115-*b* may indicate the corresponding transmit power (e.g., via a sidelink reference signal configuration, SCI, etc.) or use a preconfigured power. In some cases, the UE 115-*a* may transmit control signaling 215 to the UE 115-*b*. In such cases, the control signaling 215 may include the sidelink TCI 205 and a sidelink power control. Further, the sidelink power control may include the sidelink power control identifier and a set of sidelink power control parameters.

The UE 115-*b* may determine (e.g., calculate, ascertain, or identify) the transmit power value for the beam 210 according to one or more power control parameters and a sidelink power control formula. For example, the UE 115-*b* may determine the transmit power value based at least in part on associating the sidelink pathloss reference signal 230 to the sidelink TCI 205 and sidelink power control included in the control signaling 215. In such cases, the sidelink TCI 205 may include a sidelink TCI state identifier, a QCL information type, a sidelink pathloss reference signal identifier, or a sidelink power control identifier, or the like. The sidelink power control included in the control signaling 215 may include the sidelink power control identifier and a set of sidelink power control parameters. In some cases, the determined transmit power value may be applied to the PSCCH, the PSSCH, the PSFCH, or a combination thereof.

In some cases, the UE 115-*a* may transmit, to the UE 115-*b*, a sidelink RRC message including the sidelink TCI 205, the sidelink power control, or both. In some cases, if the sidelink pathloss reference signal 230 is not present in the TCI state, then the reference signal for the TCI state may be used as the sidelink pathloss reference signal 230. For example, there may be a default reference signal associated with the TCI state identifier that may be used if, for example, the sidelink pathloss reference signal 230 is not present in the TCI state. In some cases, when the TCI state is activated, the associated sidelink pathloss reference signals and parameters are also activated. That is, the MAC-CE may not involve activation or deactivation. In some cases, the UE 115-*a* may transmit, to the UE 115-*b*, a SCI 225. In such cases, the sidelink TCI 205 and the sidelink power control may be based at least in part on the TCI codepoint associated with the SCI 225. For example, a TCI codepoint in the SCI 225 may select the TCI states and the sidelink pathloss reference signal 230 and parameters.

In some cases, sidelink RRC signaling may be used to change sidelink power control parameters. However, sidelink RRC signaling may be associated with a delay. Accordingly, a list of sidelink power control parameters may be configured in sidelink TCI states, and sidelink MAC-CE or SCI may be used to select a sidelink power control parameter from the list. For example, the sidelink TCI 205 may include a set of sidelink power control identifiers. Further, the sidelink power control (e.g., the sidelink power control included in the control signaling 215) may include a set of sidelink power control identifiers, and each of one or more sidelink power control identifiers of the set of sidelink power control identifiers may be associated with a respective set of sidelink power control parameters. In such cases, the UE 115-*a* may select the sidelink power control identifier and the set of sidelink power control identifiers based at least in part on the sidelink MAC-CE, the SCI 225, or both.

In some cases, the UE 115-*a* may associate each one or more sidelink pathloss reference signal identifiers or each of one or more sidelink power control identifiers with the sidelink TCI 205 based at least in part on the sidelink MAC-CE. For example, the sidelink unified TCI state may contain a list of power control parameters. In such cases, the sidelink power control parameter associated with the first sidelink power control identifier may be used (i.e., by default). Additionally, or alternatively, the sidelink power control parameter associated with a different sidelink power control identifier (i.e., a second or third power control identifier) may be selected (i.e., dynamically) based at least in part on the sidelink MAC-CE, SCI, or both. Additionally, or alternatively, the sidelink MAC-CE may be irrespective of the sidelink pathloss reference signal identifier.

The network entity 105-*a* may transmit, to the UE 115-*a*, the sidelink TCI 205. In some cases, the UE 115-*a* may be configured to be connected to the UE 115-*b*. Further, the UE 115-*a* may select the beam 210 (e.g., the UE 115-*a* may select the beam 210-*a*, the beam 210-*b*, or a beam 210-*c* which may be associated with the beam 210-*d*, the beam 210-*e*, or a beam 210-*f* in a beam pair). In some cases, the UE 115-*a* may select the beam 210 based at least in part on the sidelink TCI 205. In such cases, the sidelink TCI 205 may include at least one or more of sidelink TCI state identifier, a QCL information type, a sidelink pathloss reference signal identifier, a sidelink power control identifier, or the like. Further, the UE 115-*a* may transmit control signaling 215 to the UE 115-*b*. In some cases, the control signaling 215 may include the sidelink TCI 205 and a sidelink power control. In such cases, the sidelink power control may include the sidelink power control identifier and a set of sidelink power control parameters.

In some cases, the UE 115-*a* may transmit, to the UE 115-*b*, a sidelink TCI transmission 220. In such cases, the sidelink TCI transmission 220 may be included with the sidelink power control in a sidelink RRC message, a sidelink MAC-CE, or both. In some cases, the UE 115-*a* may transmit, to the UE 115-*b*, the SCI 225. In such cases, the SCI 225 may be associated with TCI codepoint. Further, the sidelink TCI and the sidelink power control may be based on the TCI codepoint. In some cases, the UE 115-*a* may transmit, to the UE 115-*b*, the sidelink pathloss reference signal 230. In such cases, the sidelink pathloss reference signal 230 may be associated with the sidelink pathloss reference signal identifier of the sidelink TCI 205. In some cases, the UE 115-*b* may associate the sidelink pathloss reference signal 230 to the sidelink TCI 205 and a sidelink power control. Further, the UE 115-*b* may determine a transmit power value for the beam 210. In some examples, the UE 115-*b* may transmit a sidelink communication 235 in accordance with the transmit power value for the beam 210.

Figure 3:
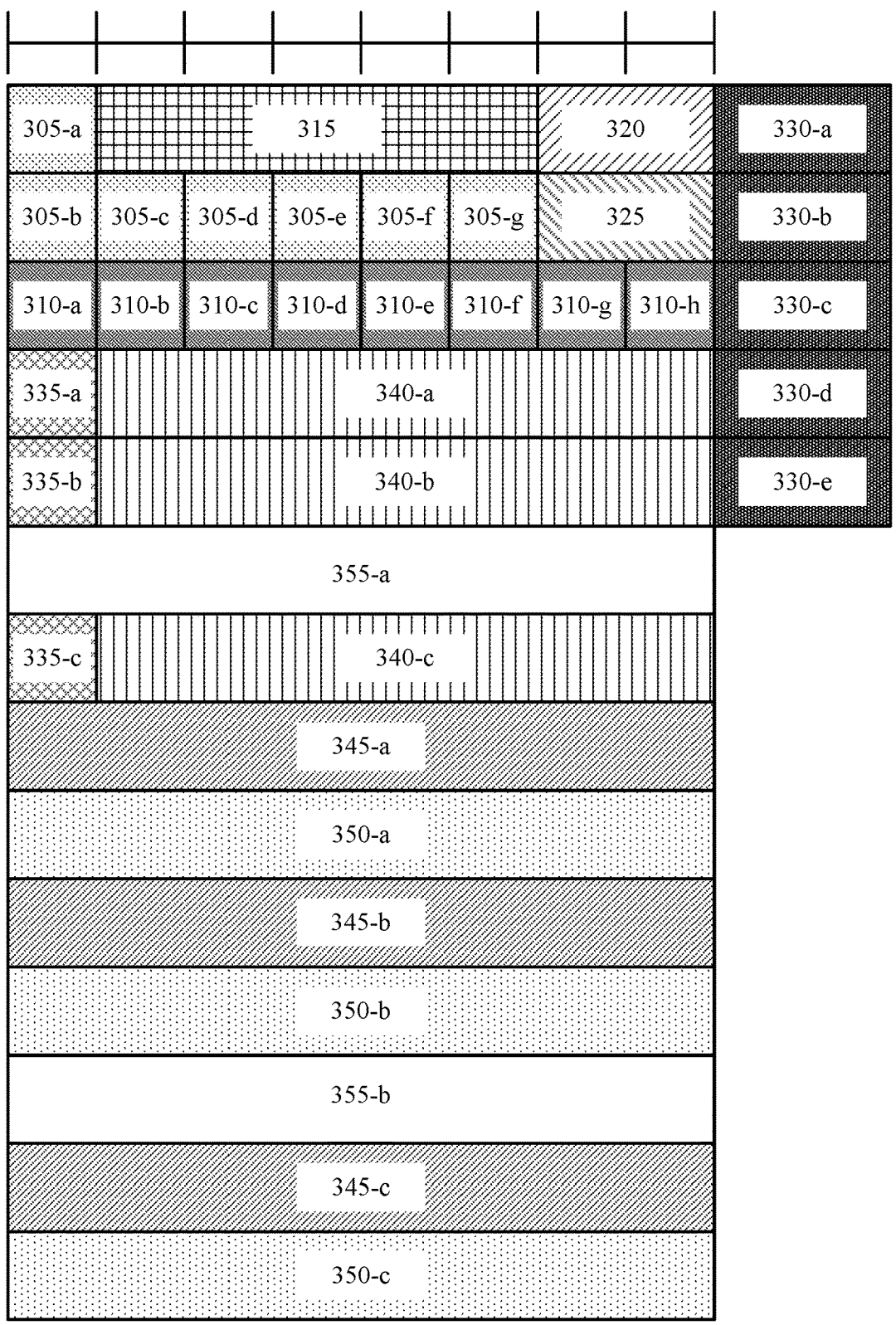
FIG. 3 illustrates an example of a MAC-CE configuration that supports sidelink power control with unified TCIs in accordance with one or more aspects of the present disclosure.

FIG. 3 illustrates an example of a MAC-CE configuration 300 that supports sidelink power control with unified TCIs in accordance with one or more aspects of the present disclosure. In some examples, the MAC-CE configuration 300 may implement or be implemented by aspects of the wireless communications system 100, the wireless communications system 200, or any combination thereof as described with reference to FIGS. 1 and 2, respectively. For example, the MAC-CE configuration 300 may be implemented by a network entity or a UE, or any combination thereof, which may be an example of a network entity 105 and UE 115 as described with reference to FIGS. 1 and 2, respectively.

The MAC-CE configuration 300 may include one or more reserved bits 305 (e.g., a reserved bit 305-*a*, a reserved bit 305-*b*, a reserved bit 305-*c*, a reserved bit 305-*d*, a reserved bit 305-*e*, a reserved bit 305-*f*, a reserved bit 305-*g*, etc.), a serving cell identifier 315, a forward link bandwidth part (BWP) identifier 320, a reverse link BWP identifier 325, and a quantity of octet (Oct) (e.g., an Oct 1 330-*a*, an Oct 2 330-*b*, an Oct 1 330-*c*, an Oct 2 330-*d*, an Oct 1 330-*e*, etc.), or a combination thereof.

By way of example, a first UE 115 may transmit, to a second UE 115, aa sidelink MAC-CE according to the MAC-CE configuration 300 including a sidelink TCI and a sidelink power control. The sidelink power control may include a sidelink power control identifier 350 (e.g., SL-PowerControl-ID 1, SL-PowerControl-ID 2, SL-PowerControl-ID M) and a set of sidelink power control parameters. The second UE 115 may associate each one or more sidelink pathloss reference signal identifiers 345 (e.g., SL-PathlossReferenceRS-ID 1, SL-PathlossReferenceRS-ID 2, SL-PathlossReferenceRS-ID M) or each one of one or more sidelink power control identifiers 350 (e.g., SL-PowerControl-ID 1, SL-PowerControl-ID 2, SL-PowerControl-ID M) with the sidelink TCI based at least in part on the sidelink MAC-CE. Additionally or alternatively, the sidelink MAC-CE may be irrespective of a sidelink pathloss reference signal identifier 345 (e.g., SL-PathlossReferenceRS-ID 1, SL-PathlossReferenceRS-ID 2, SL-PathlossReferenceRS-ID M).

In some cases, each sidelink pathloss reference signal identifier 345 (e.g., SL-PathlossReferenceRS-ID 1, SL-PathlossReferenceRS-ID 2, SL-PathlossReferenceRS-ID M) and sidelink power control identifier 350 (e.g., SL-PowerControl-ID 1, SL-PowerControl-ID 2, SL-PowerControl-ID M) may be associated with a shared joint TCI state, or a shared separate reverse link TCI state. In some cases, a shared separate forward link TCI state might not have an associated sidelink pathloss reference signal identifier 345 (e.g., SL-PathlossReferenceRS-ID 1, SL-PathlossReferenceRS-ID 2, SL-PathlossReferenceRS-ID M) and sidelink power control identifier 350 (e.g., SL-PowerControl-ID 1, SL-PowerControl-ID 2, SL-PowerControl-ID M). In some other cases, the MAC-CE sidelink might not include the sidelink pathloss reference signal identifier 345 (e.g., SL-PathlossReferenceRS-ID 1, SL-PathlossReferenceRS-ID 2, SL-PathlossReferenceRS-ID M). In this case either the reference signal for the TCI state associated with the sidelink power control identifier 350 (e.g., SL-PowerControl-ID 1, SL-PowerControl-ID 2, SL-PowerControl-ID M) may be used as sl-pathlossReferenceRS, or the sl-PathlossReferenceRS-Id is included in the RRC Configured TCI state.

In some cases, the first UE 115 may transmit, to the second UE 115, SCI. In such cases, the sidelink TCI and the sidelink power control may be based at least in part on a TCI codepoint associated with the SCI. Additionally or alternatively, a quantity of TCI states may be selectable in accordance with the TCI codepoint associated with the SCI based at least in part on a sidelink RRC configuration. For example, the TCI states may be associated with a TCI state identifier 340 (e.g., a TCI state identifier 340-*a*, a TCI state identifier 340-*b*, a TCI state identifier 340-*c*, etc.). There may be a quantity of TCI state identifiers 355-*a*. For example, the quantity of TCI states (i.e., associated with the TCI state identifier 340) selected by the TCI codepoint in the SCI may depend on the RRC configuration and a quantity of corresponding positions 310. For example, the quantity of TCI states selected by the TCI codepoint in the SCI may depend on the quantity of corresponding positions, such as a position 310-*a*, a position 310-*b*, a position 310-*c*, a position 310-*d*, a position 310-*e*, a position 310-*f*, a position 310-*g*, a position 310-*h*, etc. In some cases, the RRC may be configured for shared joint TCI or shared separate TCI. Put another way, the number of TCI states selects by the TCI codepoint in SCI depends on whether RRC configures shared joint or shared separate TCI, and on the number Pi (e.g., 310) in the corresponding positions.

In some cases, the sidelink TCI may include one or more of a sidelink TCI state identifier 340, a QCL information type, a sidelink pathloss reference signal identifier 345, or the sidelink power control identifier 350. In some cases, a TCI state may be one of a shared joint TCI state, a shared separate reverse link TCI state, or a shared separate forward link TCI state. In such cases, a forward or reverse link bit 335 may indicate whether a TCI state is a shared joint TCI state or shared separate reverse link TCI state, or a shared separate forward link TCI state. For example, the TCI state identifier 340-*a* may be associated with a forward or reverse link bit 335-*a*, the TCI state identifier 340-*b* may be associated with a forward or reverse link bit 335-*b*, the TCI state identifier 340-*c* may be associated with a forward or reverse link bit 335-*c*, etc.

A TCI state may be associated with the sidelink pathloss reference signal identifier 345, the sidelink power control identifier 350, or both. For example, the TCI state identifier 340-*a* may be associated with a sidelink pathloss reference signal identifier 345-*a* and a sidelink power control identifier 350-*a*, the TCI state identifier 340-*b* may be associated with a sidelink pathloss reference signal identifier 345-*b* and a sidelink power control identifier 350-*b*, the TCI state identifier 340-*c* may be associated with a sidelink pathloss reference signal identifier 345-*c* and a sidelink power control identifier 350-*c*, etc. There may be a quantity of associations between TCI state identifiers and sidelink pathloss reference signal identifiers, sidelink power control identifiers, or both 355-*b*.

In some cases, a TCI state (e.g., a shared separate forward link TCI state) may not be associated with the sidelink pathloss reference signal identifier 345, the sidelink power control identifier 350, or both. In some cases, the MAC-CE may not include the sidelink pathloss reference signal identifier 345. In such cases, the sidelink pathloss reference signal identifier 345 may be included in the RRC configured TCI state, or the reference signal for the TCI state associated with the sidelink power control identifier 350 may be used as the sidelink pathloss reference signal identifier 345.

Figure 4:
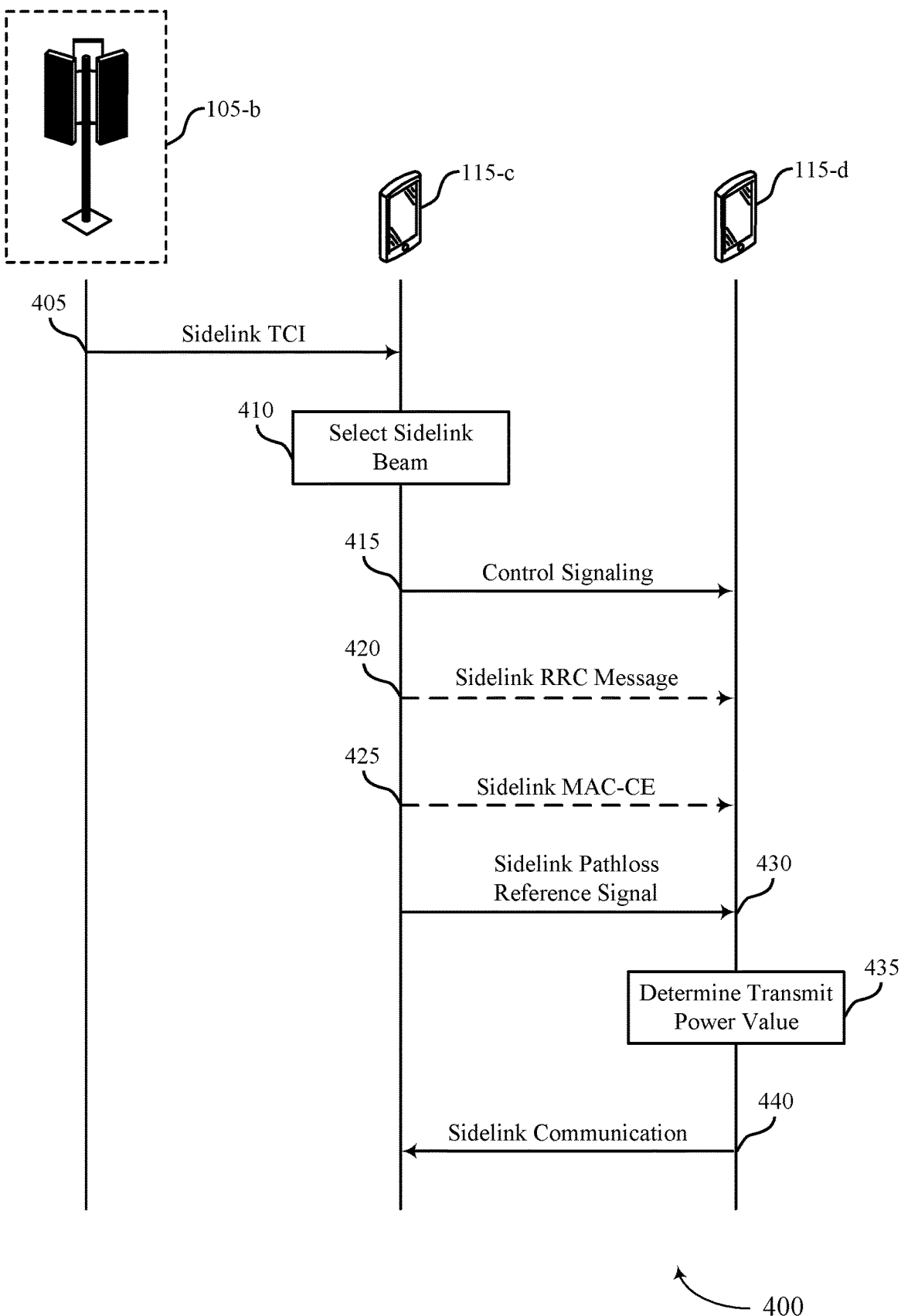
FIG. 4 illustrates an example of a process flow that supports sidelink power control with unified TCIs in accordance with one or more aspects of the present disclosure.

FIG. 4 illustrates an example of a process flow 400 that supports sidelink power control with unified TCIs in accordance with one or more aspects of the present disclosure. In some examples, the process flow 400 may implement or be implemented by aspects of the wireless communications system 100, the wireless communications system 200, the MAC-CE configuration 300, or any combination thereof as described with reference to FIGS. 1 through 3, respectively. For example, the process flow 400 may be implemented by a network entity 105-b, a UE 115-c, or a UE 115-d, which may be an example of a network entity 105 and UEs 115 as described with reference to FIGS. 1 through 3, respectively. In the following description of the process flow 400, the operations between the network entity 105-b, the UE 115-c, and the UE 115-d may be transmitted in a different order than the example order shown, or the operations performed by the network entity 105-b, the UE 115-c, and the UE 115-d may be performed in different orders or at different times. Some operations may also be omitted from the process flow 400, and other operations may be added to the process flow 400.

At 405, the UE 115-c may receive, from the network entity 105-b, a sidelink TCI. In some cases, the sidelink TCI may include a sidelink TCI state identifier, a QCL information type, a sidelink pathloss reference signal identifier, a sidelink power control identifier, or the like. In some other cases, the UE 115-c may transmit, to the UE 115-d, SCI. In such cases, a sidelink TCI and a sidelink power control may be based at least in part on a TCI codepoint associated with the SCI. Further, the UE 115-c may select from a quantity of sidelink TCI states selectable in accordance with the TCI codepoint associated with the SCI, a TCI state. In such cases, the quantity of sidelink TCI states selectable may be based at least in part on a sidelink RRC configuration.

At 410, the UE 115-c may select a sidelink beam. For example, the UE 115-c may select a sidelink beam for the UE 115-d based on the sidelink TCI. In some cases, the UE 115-d may be configured to be connected to the UE 115-c.

At 415, the UE 115-c may transmit, to the UE 115-d, control signaling. In some cases, the control signaling may include the sidelink TCI and the sidelink power control. Further, the sidelink power control may include the sidelink power control identifier and a set of sidelink power control parameters. In some cases, the sidelink TCI may include a set of sidelink power control identifiers, and a sidelink power control may include a set of sidelink power control identifiers. In such cases, each of one or more sidelink power control identifiers of the set of sidelink power control identifiers may be associated with a respective set of sidelink power control parameters. Further, the UE 115-c may select the sidelink power control identifier and the set of sidelink power control parameters based at least in part on a sidelink MAC-CE, or SCI, or both. In some cases, the sidelink TCI may be applicable to a forward link between the UE 115-c and the UE 115-d or a reverse link between the UE 115-d and the UE 115-c, or both. Further, the sidelink TCI may be applicable to one or more of a PSCCH, a PSSCH, or a PSFCH.

At 420, the UE 115-c may transmit, to the UE 115-d, a sidelink RRC message. In some cases, the sidelink RRC message may include the sidelink TCI, the sidelink power control, or a combination thereof.

At 425, the UE 115-c may transmit, to the UE 115-d, the sidelink MAC-CE. In some cases, the MAC-CE may include the sidelink TCI, the sidelink power control, or a combination thereof. In some other cases, the UE 115-c may associate each of one or more sidelink pathloss reference signal identifiers or each of one or more sidelink power control identifiers with the sidelink TCI based at least in part on a sidelink MAC-CE. In some cases, the sidelink MAC-CE may be irrespective of the sidelink pathloss reference signal identifier.

At 430, the UE 115-c may transmit, to the UE 115-d, a sidelink pathloss reference signal. In some cases, the sidelink pathloss reference signal may be associated with the sidelink pathloss reference signal identifier of the sidelink TCI. Further, the transmission may be based at least in part on a transmit power value for the sidelink pathloss reference signal. In some cases, the UE 115-c may transmit, to the UE 115-d, an indication of the transmit power value for the sidelink pathloss reference signal. In such cases, a UE 115-c may transmit, to the UE 115-d, SCI indicating the transmit power value for the sidelink pathloss reference signal.

At 435, the UE 115-d may determine the transmit power value. In some cases, the UE 115-d may determine the transmit power value based on associating the sidelink pathloss reference signal to a sidelink TCI and a sidelink power control. In such cases, the sidelink TCI may include a sidelink TCI state identifier, a QCL information type, a sidelink pathloss reference signal identifier, a sidelink power control identifier, or the like. Further, the sidelink power control may include the sidelink power control identifier and a set of sidelink power control parameters.

At 440, the UE 115-d may transmit, to the UE 115-c, a sidelink communication. In such cases, the UE 115-d may perform the sidelink communication according to the transmit power value for the sidelink beam.

Figure 5:
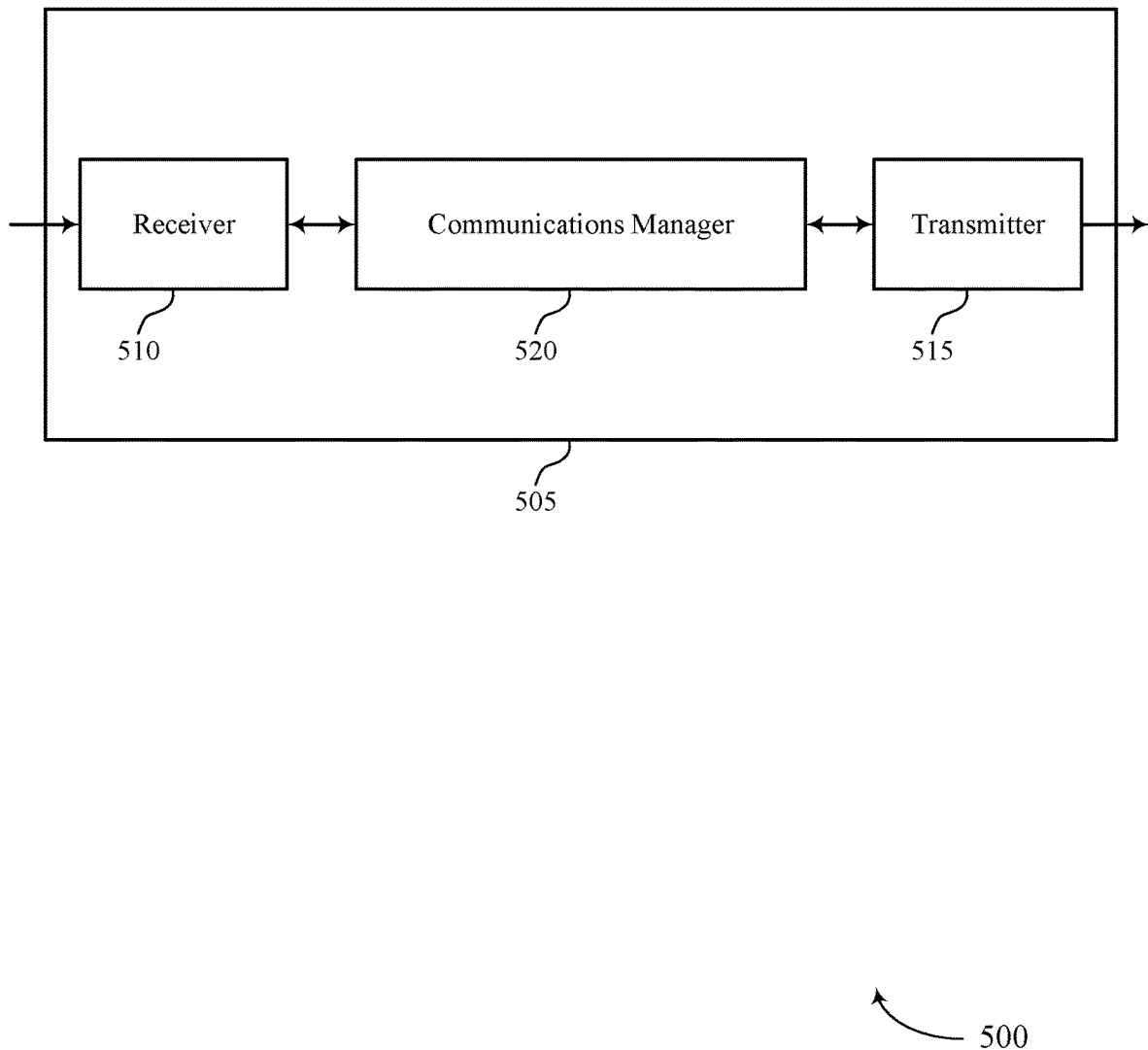
FIGS. 5 and 6 illustrate block diagrams of devices that support sidelink power control with unified TCIs in accordance with one or more aspects of the present disclosure.

FIG. 5 illustrates a block diagram 500 of a device 505 that supports sidelink power control with unified TCIs in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink power control with unified TCIs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink power control with unified TCIs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink power control with unified TCIs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first device (e.g., the device 505) in accordance with examples as disclosed herein. For example, the communications manager 520 may be configured as or otherwise support a means for selecting a sidelink beam for a second device configured to be connected to the first device based on a sidelink TCI, where the sidelink TCI includes a sidelink pathloss reference signal identifier, or a sidelink power control identifier, or both. The communications manager 520 may be configured as or otherwise support a means for transmitting a sidelink pathloss reference signal to the second device configured to be connected to the first device, where the sidelink pathloss reference signal is associated with the sidelink pathloss reference signal identifier of the sidelink TCI.

Additionally, or alternatively, the communications manager 520 may support wireless communication at a first device (e.g., the device 505) in accordance with examples as disclosed herein. For example, the communications manager 520 may be configured as or otherwise support a means for receiving a sidelink pathloss reference signal from a second device configured to be connected to the first device. The communications manager 520 may be configured as or otherwise support a means for associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters. The communications manager 520 may be configured as or otherwise support a means for determining a transmit power value for a sidelink beam of the first device based on the associating. The communications manager 520 may be configured as or otherwise support a means for performing sidelink communication on the sidelink beam in accordance with the transmit power value for the sidelink beam.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption.

Figure 6:
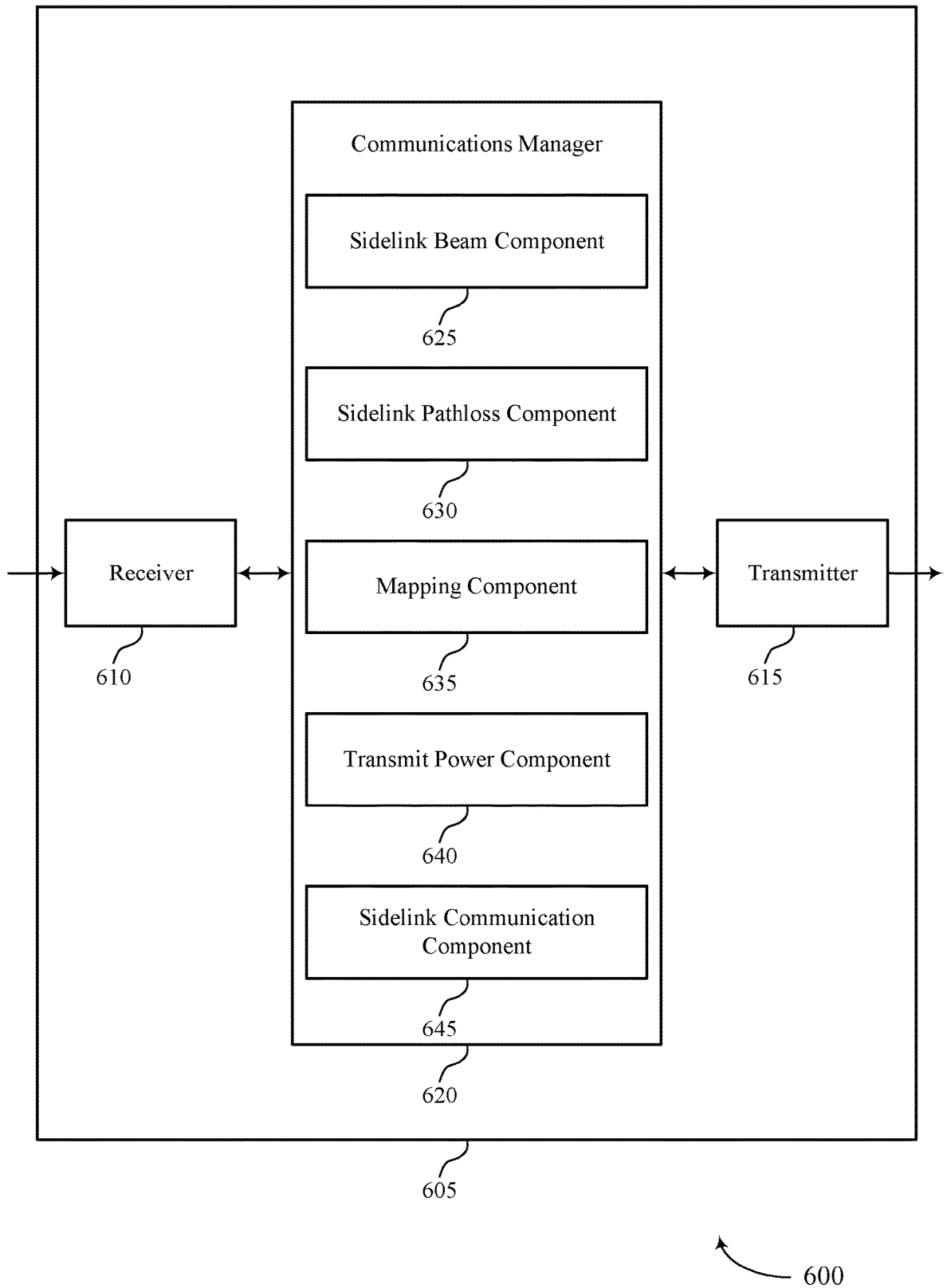

FIG. 6 illustrates a block diagram 600 of a device 605 that supports sidelink power control with unified TCIs in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink power control with unified TCIs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink power control with unified TCIs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink power control with unified TCIs as described herein. For example, the communications manager 620 may include a sidelink beam component 625, a sidelink pathloss component 630, a mapping component 635, a transmit power component 640, a sidelink communication component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first device (e.g., the device 605) in accordance with examples as disclosed herein. The sidelink beam component 625 may be configured as or otherwise support a means for selecting a sidelink beam for a second device configured to be connected to the first device based on a sidelink TCI, where the sidelink TCI includes a sidelink pathloss reference signal identifier, or a sidelink power control identifier, or both. The sidelink pathloss component 630 may be configured as or otherwise support a means for transmitting a sidelink pathloss reference signal to the second device configured to be connected to the first device, where the sidelink pathloss reference signal is associated with the sidelink pathloss reference signal identifier of the sidelink TCI.

Additionally, or alternatively, the communications manager 620 may support wireless communication at a first device (e.g., the device 605) in accordance with examples as disclosed herein. The sidelink pathloss component 630 may be configured as or otherwise support a means for receiving a sidelink pathloss reference signal from a second device configured to be connected to the first device. The mapping component 635 may be configured as or otherwise support a means for associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters. The transmit power component 640 may be configured as or otherwise support a means for determining a transmit power value for a sidelink beam of the first device based on the associating. The sidelink communication component 645 may be configured as or otherwise support a means for performing sidelink communication on the sidelink beam in accordance with the transmit power value for the sidelink beam.

Figure 7:
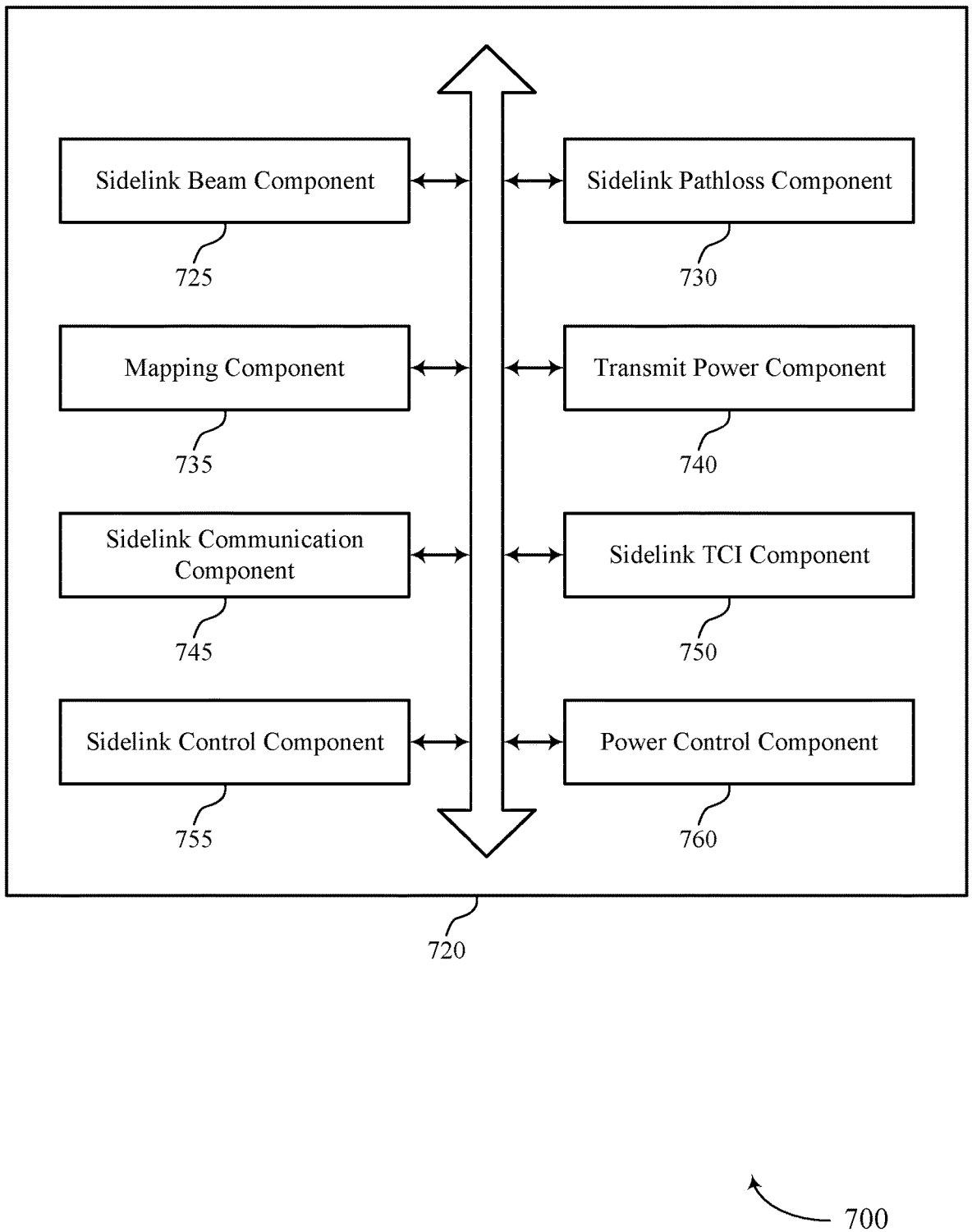
FIG. 7 illustrates a block diagram of a communications manager that supports sidelink power control with unified TCIs in accordance with one or more aspects of the present disclosure.

FIG. 7 illustrates a block diagram 700 of a communications manager 720 that supports sidelink power control with unified TCIs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of sidelink power control with unified TCIs as described herein. For example, the communications manager 720 may include a sidelink beam component 725, a sidelink pathloss component 730, a mapping component 735, a transmit power component 740, a sidelink communication component 745, a sidelink TCI component 750, a sidelink control component 755, a power control component 760, or any combination thereof. Each of these components may communicate, directly or indirectly, with one another (e.g., via one or more buses).

The communications manager 720 may support wireless communication at a first device in accordance with examples as disclosed herein. The sidelink beam component 725 may be configured as or otherwise support a means for selecting a sidelink beam for a second device configured to be connected to the first device based on a sidelink TCI, where the sidelink TCI includes a sidelink pathloss reference signal identifier, or a sidelink power control identifier, or both. The sidelink pathloss component 730 may be configured as or otherwise support a means for transmitting a sidelink pathloss reference signal to the second device configured to be connected to the first device, where the sidelink pathloss reference signal is associated with the sidelink pathloss reference signal identifier of the sidelink TCI.

In some examples, the sidelink TCI component 750 may be configured as or otherwise support a means for transmitting control signaling including the sidelink TCI and a sidelink power control, where the sidelink power control includes the sidelink power control identifier and a set of sidelink power control parameters. In some examples, the sidelink TCI component 750 may be configured as or otherwise support a means for transmitting a sidelink RRC message including one or both of the sidelink TCI and the sidelink power control. In some examples, the sidelink TCI component 750 may be configured as or otherwise support a means for transmitting a sidelink MAC-CE including one or both of the sidelink TCI and the sidelink power control.

In some examples, transmitting to the second device configured to be connected to the first device the sidelink pathloss reference signal is based on a transmit power value for the sidelink pathloss reference signal. In some examples, the transmit power component 740 may be configured as or otherwise support a means for transmitting an indication of the transmit power value for the sidelink pathloss reference signal. In some examples, to support transmitting the indication of the transmit power value for the sidelink pathloss reference signal, the transmit power component 740 may be configured as or otherwise support a means for transmitting a SCI indicating the transmit power value for the sidelink pathloss reference signal.

In some examples, the sidelink control component 755 may be configured as or otherwise support a means for transmitting SCI from the first device configured to be connected to the second device, where the sidelink TCI and a sidelink power control is based on a TCI codepoint associated with the SCI. In some examples, a quantity of sidelink TCI states selectable in accordance with the TCI codepoint associated with the SCI is based on a sidelink RRC configuration.

In some examples, the sidelink TCI includes a set of sidelink power control identifiers. In some examples, a sidelink power control includes a set of sidelink power control identifiers, each of one or more sidelink power control identifiers of the set of sidelink power control identifiers is associated with a respective set of sidelink power control parameters. In some examples, the power control component 760 may be configured as or otherwise support a means for selecting the sidelink power control identifier and the set of sidelink power control parameters based on a sidelink MAC-CE or SCI, or both.

In some examples, the mapping component 735 may be configured as or otherwise support a means for associating each of one or more sidelink pathloss reference signal identifiers or each of one or more sidelink power control identifiers with the sidelink TCI based on a sidelink MAC-CE. In some examples, the sidelink MAC-CE is irrespective of the sidelink pathloss reference signal identifier.

In some examples, the sidelink TCI includes a sidelink TCI state identifier, or a QCL type, or both.

In some examples, the sidelink TCI is applicable to a forward link between the first device and the second device or a reverse link between the second device and the first device, or both. In some examples, the sidelink TCI is applicable to one or more of a PSCCH, a PSSCH, or a PSFCH.

Additionally, or alternatively, the communications manager 720 may support wireless communication at a first device in accordance with examples as disclosed herein. In some examples, the sidelink pathloss component 730 may be configured as or otherwise support a means for receiving a sidelink pathloss reference signal from a second device configured to be connected to the first device. The mapping component 735 may be configured as or otherwise support a means for associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters. The transmit power component 740 may be configured as or otherwise support a means for determining a transmit power value for a sidelink beam of the first device based on the associating. The sidelink communication component 745 may be configured as or otherwise support a means for performing sidelink communication on the sidelink beam in accordance with the transmit power value for the sidelink beam.

In some examples, the sidelink TCI component 750 may be configured as or otherwise support a means for receiving control signaling including one or both of the sidelink TCI or the sidelink power control. In some examples, to support receiving the control signaling, the sidelink TCI component 750 may be configured as or otherwise support a means for receiving a sidelink RRC message including one or both of the sidelink TCI and the sidelink power control. In some examples, to support receiving the control signaling, the sidelink TCI component 750 may be configured as or otherwise support a means for receiving a sidelink MAC-CE including one or both of the sidelink TCI and the sidelink power control.

In some examples, receiving the sidelink pathloss reference signal from the second device configured to be connected to the first device is based on a transmit power value for the sidelink pathloss reference signal. In some examples, the transmit power component 740 may be configured as or otherwise support a means for receiving an indication of the transmit power value for the sidelink pathloss reference signal. In some examples, to support receiving the indication of the transmit power value for the sidelink pathloss reference signal, the transmit power component 740 may be configured as or otherwise support a means for receiving SCI indicating the transmit power value for the sidelink pathloss reference signal.

In some examples, the sidelink control component 755 may be configured as or otherwise support a means for receiving SCI from the second device configured to be connected to the first device, where the sidelink TCI and the sidelink power control is based on a TCI codepoint associated with the SCI. In some examples, a quantity of sidelink TCI states selectable in accordance with the TCI codepoint associated with the SCI is based on a sidelink RRC configuration.

In some examples, the sidelink TCI includes a set of sidelink power control identifiers. In some examples, the sidelink power control includes the set of sidelink power control identifiers, and each of one or more sidelink power control identifiers of the set of sidelink power control identifiers is associated with a respective set of sidelink power control parameters.

In some examples, the sidelink power control identifier and the set of sidelink power control parameters is based on a sidelink MAC-CE or SCI, or both. In some examples, the sidelink MAC-CE is irrespective of the sidelink pathloss reference signal identifier.

In some examples, the mapping component 735 may be configured as or otherwise support a means for associating each of one or more sidelink pathloss reference signal identifiers or each of one or more sidelink power control identifiers with the sidelink TCI based on a sidelink MAC-CE.

Figure 8:
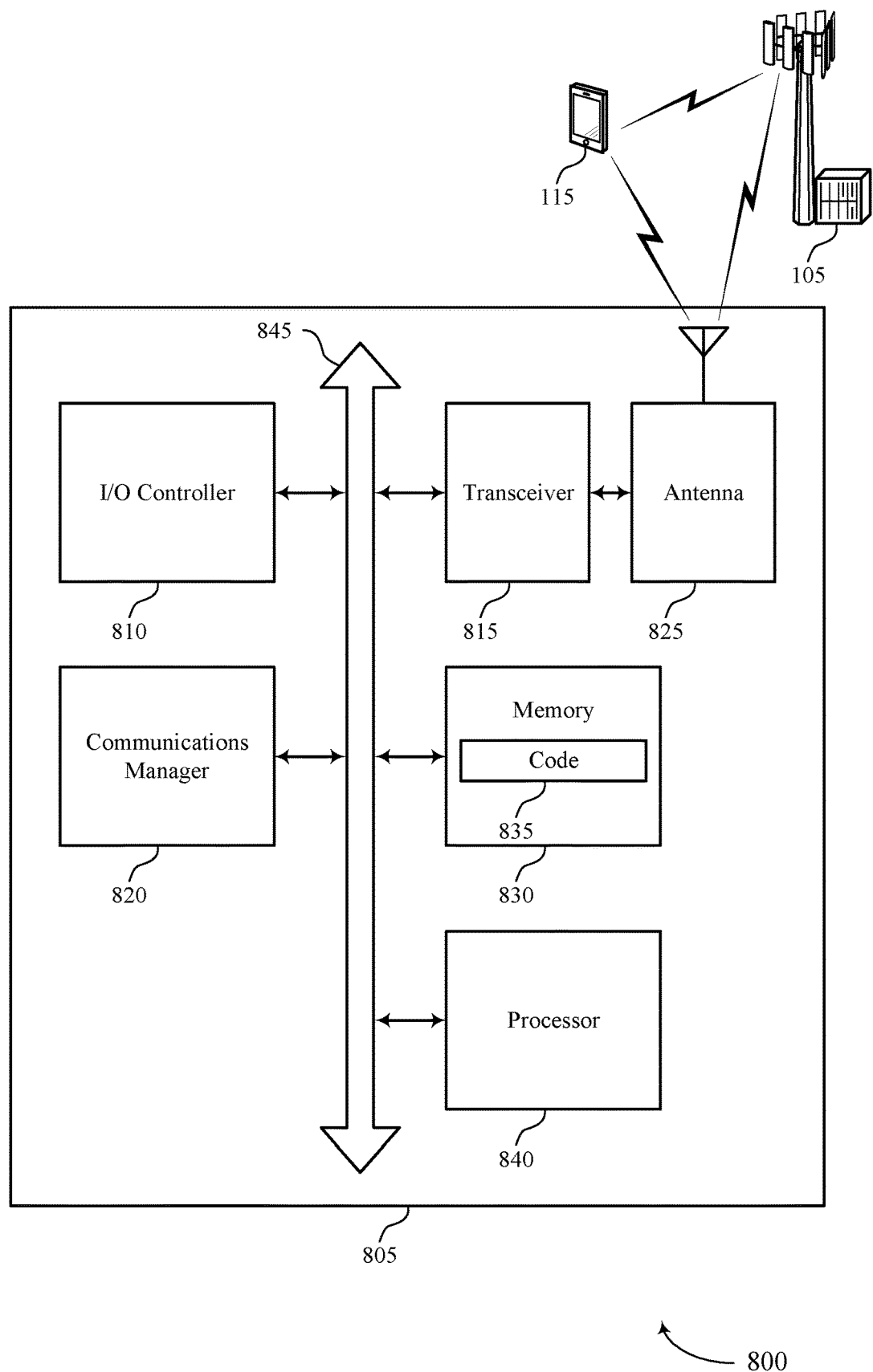
FIG. 8 illustrates a diagram of a system including a device that supports sidelink power control with unified TCIs in accordance with one or more aspects of the present disclosure.

FIG. 8 illustrates a diagram of a system 800 including a device 805 that supports sidelink power control with unified TCIs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink power control with unified TCIs). For example, the device 805 or a component of the device 805 may include a processor 840 and memory 830 coupled with or to the processor 840, the processor 840 and memory 830 configured to perform various functions described herein.

The communications manager 820 may support wireless communication at a first device (e.g., the device 805) in accordance with examples as disclosed herein. For example, the communications manager 820 may be configured as or otherwise support a means for selecting a sidelink beam for a second device configured to be connected to the first device based on a sidelink TCI, where the sidelink TCI includes a sidelink pathloss reference signal identifier, or a sidelink power control identifier, or both. The communications manager 820 may be configured as or otherwise support a means for transmitting a sidelink pathloss reference signal to the second device configured to be connected to the first device, where the sidelink pathloss reference signal is associated with the sidelink pathloss reference signal identifier of the sidelink TCI.

Additionally, or alternatively, the communications manager 820 may support wireless communication at a first device (e.g., the device 805) in accordance with examples as disclosed herein. For example, the communications manager 820 may be configured as or otherwise support a means for receiving a sidelink pathloss reference signal from a second device configured to be connected to the first device. The communications manager 820 may be configured as or otherwise support a means for associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters. The communications manager 820 may be configured as or otherwise support a means for determining a transmit power value for a sidelink beam of the first device based on the associating. The communications manager 820 may be configured as or otherwise support a means for performing sidelink communication on the sidelink beam in accordance with the transmit power value for the sidelink beam.

By including or configuring the communications manager 820 in accordance with examples as described herein, the device 805 may support techniques for reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink power control with unified TCIs as described herein, or the processor 840 and the memory 830 may be otherwise configured to perform or support such operations.

Figure 9:
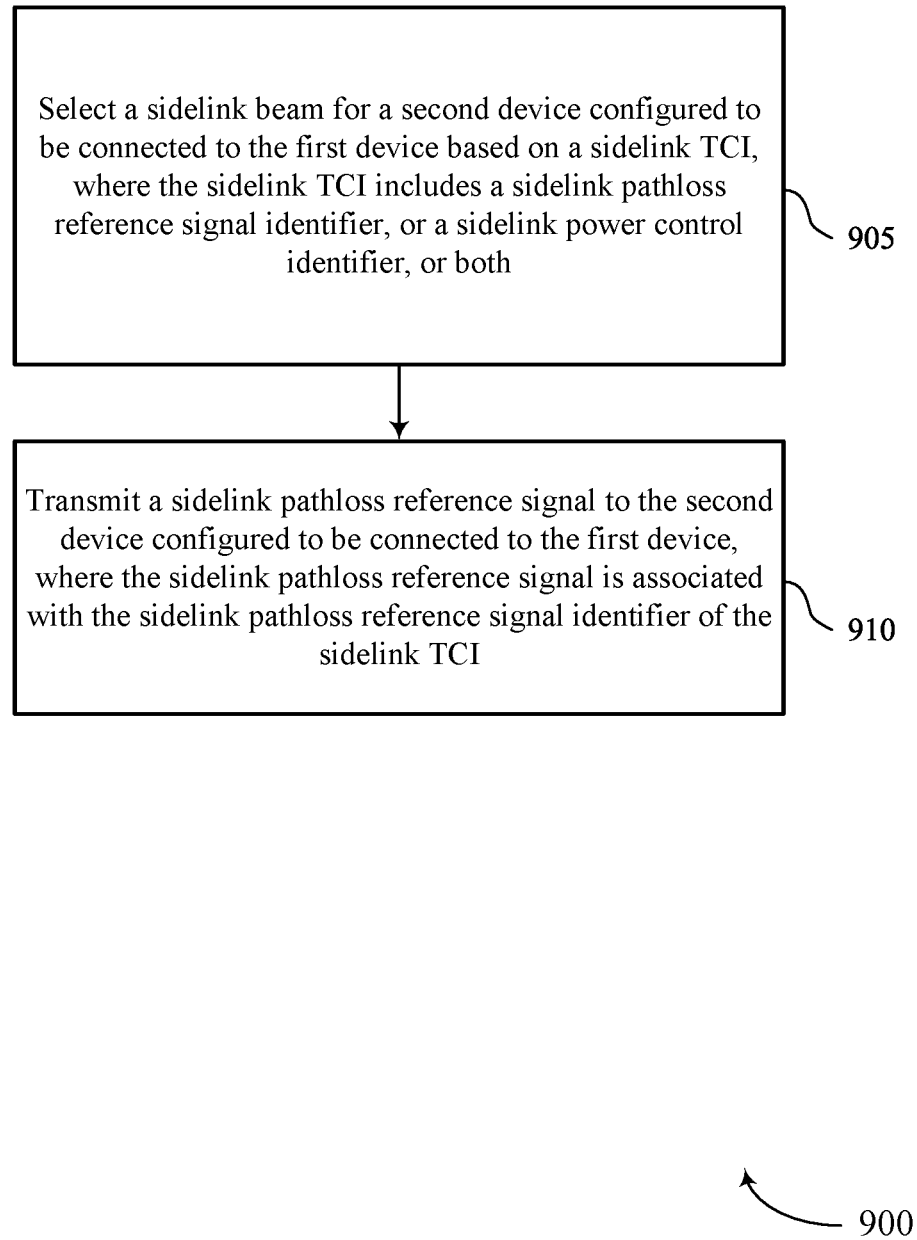
FIGS. 9 and 10 illustrate flowcharts showing methods that support sidelink power control with unified TCIs in accordance with one or more aspects of the present disclosure.

FIG. 9 illustrates a flowchart showing a method 900 that supports sidelink power control with unified TCIs in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include selecting a sidelink beam for a second device configured to be connected to the first device based on a sidelink TCI, where the sidelink TCI includes a sidelink pathloss reference signal identifier, or a sidelink power control identifier, or both. The operations of 905 may be performed in accordance with examples as disclosed herein. In some examples, aspects of the operations of 905 may be performed by a sidelink beam component 725 as described with reference to FIG. 7.

At 910, the method may include transmitting a sidelink pathloss reference signal to the second device configured to be connected to the first device, where the sidelink pathloss reference signal is associated with the sidelink pathloss reference signal identifier of the sidelink TCI. The operations of 910 may be performed in accordance with examples as disclosed herein. In some examples, aspects of the operations of 910 may be performed by a sidelink pathloss component 730 as described with reference to FIG. 7.

Figure 10:
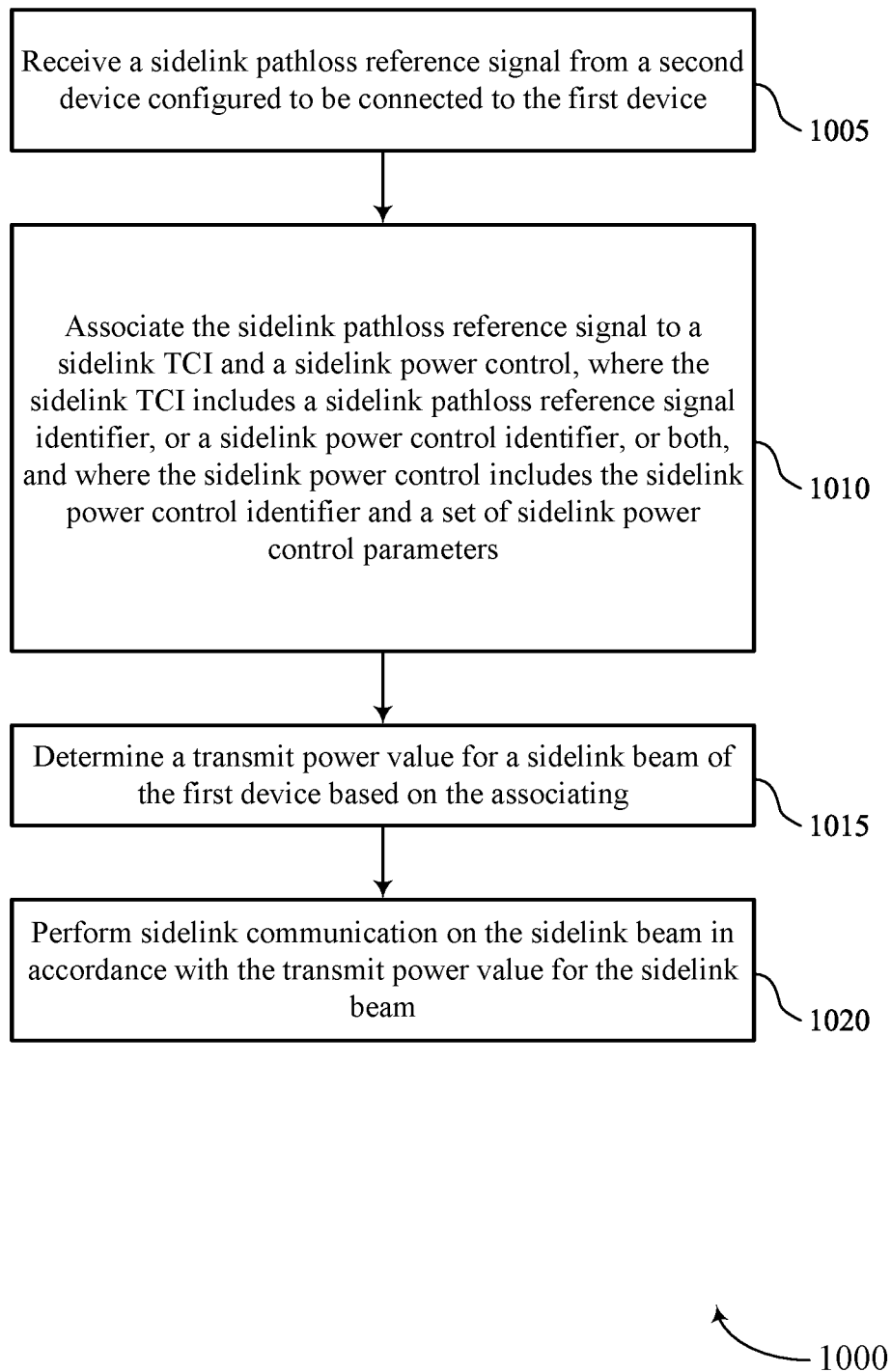

FIG. 10 illustrates a flowchart showing a method 1000 that supports sidelink power control with unified TCIs in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a sidelink pathloss reference signal from a second device configured to be connected to the first device. The operations of 1005 may be performed in accordance with examples as disclosed herein. In some examples, aspects of the operations of 1005 may be performed by a sidelink pathloss component 730 as described with reference to FIG. 7.

At 1010, the method may include associating the sidelink pathloss reference signal to a sidelink TCI and a sidelink power control, where the sidelink TCI includes a sidelink pathloss reference signal identifier, or a sidelink power control identifier, or both, and where the sidelink power control includes the sidelink power control identifier and a set of sidelink power control parameters. The operations of 1010 may be performed in accordance with examples as disclosed herein. In some examples, aspects of the operations of 1010 may be performed by a mapping component 735 as described with reference to FIG. 7.

At 1015, the method may include determining a transmit power value for a sidelink beam of the first device based on the associating. The operations of 1015 may be performed in accordance with examples as disclosed herein. In some examples, aspects of the operations of 1015 may be performed by a transmit power component 740 as described with reference to FIG. 7.

At 1020, the method may include performing sidelink communication on the sidelink beam in accordance with the transmit power value for the sidelink beam. The operations of 1020 may be performed in accordance with examples as disclosed herein. In some examples, aspects of the operations of 1020 may be performed by a sidelink communication component 745 as described with reference to FIG. 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: selecting a sidelink beam for a second device configured to be connected to the first device based at least in part on a sidelink TCI, wherein the sidelink TCI comprises a sidelink pathloss reference signal identifier, or a sidelink power control identifier, or both; and transmitting a sidelink pathloss reference signal to the second device configured to be connected to the first device, wherein the sidelink pathloss reference signal is associated with the sidelink pathloss reference signal identifier of the sidelink TCI.

Aspect 2: The method of aspect 1, further comprising: transmitting control signaling comprising the sidelink TCI and a sidelink power control, wherein the sidelink power control comprises the sidelink power control identifier and a set of sidelink power control parameters.

Aspect 3: The method of aspect 2, further comprising: transmitting a sidelink RRC message comprising one or both of the sidelink TCI and the sidelink power control.

Aspect 4: The method of any of aspects 2 through 3, further comprising: transmitting a sidelink MAC-CE comprising one or both of the sidelink TCI and the sidelink power control.

Aspect 5: The method of any of aspects 1 through 4, wherein transmitting to the second device configured to be connected to the first device the sidelink pathloss reference signal is based at least in part on a transmit power value for the sidelink pathloss reference signal.

Aspect 6: The method of aspect 5, further comprising: transmitting an indication of the transmit power value for the sidelink pathloss reference signal.

Aspect 7: The method of aspect 6, wherein transmitting the indication of the transmit power value for the sidelink pathloss reference signal comprises: transmitting a SCI indicating the transmit power value for the sidelink pathloss reference signal.

Aspect 8: The method of any of aspects 1 through 7, further comprising: transmitting SCI from the first device configured to be connected to the second device, wherein the sidelink TCI and a sidelink power control is based at least in part on a TCI codepoint associated with the SCI.

Aspect 9: The method of aspect 8, wherein a quantity of sidelink TCI states selectable in accordance with the TCI codepoint associated with the SCI is based at least in part on a sidelink RRC configuration.

Aspect 10: The method of any of aspects 1 through 9, wherein the sidelink TCI comprises a set of sidelink power control identifiers, and a sidelink power control comprises a set of sidelink power control identifiers, each of one or more sidelink power control identifiers of the set of sidelink power control identifiers is associated with a set of sidelink power control parameters.

Aspect 11: The method of aspect 10, further comprising: selecting the sidelink power control identifier and the set of sidelink power control parameters based at least in part on a sidelink MAC-CE or SCI, or both.

Aspect 12: The method of aspect 11, wherein the sidelink MAC-CE is irrespective of the sidelink pathloss reference signal identifier.

Aspect 13: The method of any of aspects 1 through 12, further comprising: associating each of one or more sidelink pathloss reference signal identifiers or each of one or more sidelink power control identifiers with the sidelink TCI based at least in part on a sidelink MAC-CE.

Aspect 14: The method of any of aspects 1 through 13, wherein the sidelink TCI comprises a sidelink TCI state identifier, or a QCL information type, or both.

Aspect 15: The method of any of aspects 1 through 13, wherein the sidelink TCI is applicable to a forward link between the first device and the second device or a reverse link between the second device and the first device, or both, and the sidelink TCI is applicable to one or more of a PSCCH, a PSSCH, or a PSFCH.

Aspect 16: A method for wireless communication at a first device, comprising: receiving a sidelink pathloss reference signal from a second device configured to be connected to the first device; associating the sidelink pathloss reference signal to a sidelink TCI and a sidelink power control, wherein the sidelink TCI comprises a sidelink pathloss reference signal identifier, or a sidelink power control identifier, or both, and wherein the sidelink power control comprises the sidelink power control identifier and a set of sidelink power control parameters; determining a transmit power value for a sidelink beam of the first device based at least in part on the associating; and performing sidelink communication on the sidelink beam in accordance with the transmit power value for the sidelink beam.

Aspect 17: The method of aspect 16, further comprising: receiving control signaling comprising one or both of the sidelink TCI or the sidelink power control.

Aspect 18: The method of aspect 17, wherein receiving the control signaling comprises: receiving a sidelink RRC message comprising one or both of the sidelink TCI and the sidelink power control.

Aspect 19: The method of any of aspects 17 through 18, wherein receiving the control signaling comprises: receiving a sidelink MAC-CE comprising one or both of the sidelink TCI and the sidelink power control.

Aspect 20: The method of any of aspects 16 through 19, wherein receiving the sidelink pathloss reference signal from the second device configured to be connected to the first device is based at least in part on a transmit power value for the sidelink pathloss reference signal.

Aspect 21: The method of aspect 20, further comprising: receiving an indication of the transmit power value for the sidelink pathloss reference signal.

Aspect 22: The method of aspect 21, wherein receiving the indication of the transmit power value for the sidelink pathloss reference signal comprises: receiving SCI indicating the transmit power value for the sidelink pathloss reference signal.

Aspect 23: The method of any of aspects 16 through 22, further comprising: receiving SCI from the second device configured to be connected to the first device, wherein the sidelink TCI and the sidelink power control is based at least in part on a TCI codepoint associated with the SCI.

Aspect 24: The method of aspect 23, wherein a quantity of sidelink TCI states selectable in accordance with the TCI codepoint associated with the SCI is based at least in part on a sidelink RRC configuration.

Aspect 25: The method of any of aspects 16 through 24, wherein the sidelink TCI comprises a set of sidelink power control identifiers, and the sidelink power control comprises the set of sidelink power control identifiers, and each of one or more sidelink power control identifiers of the set of sidelink power control identifiers is associated with a set of sidelink power control parameters.

Aspect 26: The method of aspect 25, wherein the sidelink power control identifier and the set of sidelink power control parameters is based at least in part on a sidelink MAC-CE or SCI, or both.

Aspect 27: The method of aspect 26, further comprising: associating each of one or more sidelink pathloss reference signal identifiers or each of one or more sidelink power control identifiers with the sidelink TCI based at least in part on a sidelink MAC-CE.

Aspect 28: The method of aspect 27, wherein the sidelink MAC-CE is irrespective of the sidelink pathloss reference signal identifier.

Aspect 29: The method of any of aspects 16 through 24, wherein the sidelink TCI is applicable to a forward link between the first device and the second device or a reverse link between the second device and the first device, or both, and the sidelink TCI is applicable to one or more of a PSCCH, a PSSCH, or a PSFCH.

Aspect 30: An apparatus for wireless communication at a first device, comprising a processor; memory coupled with the processor; and instructions stored in the memory and executable by the processor to cause the apparatus to perform a method of any of aspects 1 through 29.

Aspect 31: An apparatus for wireless communication at a first device, comprising at least one means for performing a method of any of aspects 1 through 29.

Aspect 32: A non-transitory computer-readable medium storing code for wireless communication at a first device, the code comprising instructions executable by a processor to perform a method of any of aspects 1 through 29.

Aspect 33: An apparatus for wireless communication at a first device, comprising a processor; memory coupled with the processor; and instructions stored in the memory and executable by the processor to cause the apparatus to perform a method of any of aspects 16 through 28.

Aspect 34: An apparatus for wireless communication at a first device, comprising at least one means for performing a method of any of aspects 16 through 28.

Aspect 35: A non-transitory computer-readable medium storing code for wireless communication at a first device, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
    a processor;
    memory coupled with the processor; and
    instructions stored in the memory and executable by the processor to cause the apparatus to:
        select a sidelink beam for a second device configured to be connected to the first device based at least in part on a sidelink transmission configuration indicator, wherein the sidelink transmission configuration indicator comprises a sidelink pathloss reference signal identifier, or a sidelink power control identifier, or both; and
        transmit a sidelink pathloss reference signal to the second device configured to be connected to the first device, wherein the sidelink pathloss reference signal is associated with the sidelink pathloss reference signal identifier of the sidelink transmission configuration indicator.

2. The apparatus of claim 1, wherein the instructions are further executable by the processor to cause the apparatus to:
    transmit control signaling comprising the sidelink transmission configuration indicator and a sidelink power control,
    wherein the sidelink power control comprises the sidelink power control identifier and a set of sidelink power control parameters.

3. The apparatus of claim 2, wherein the instructions are further executable by the processor to cause the apparatus to:
    transmit a sidelink radio resource control message comprising one or both of the sidelink transmission configuration indicator and the sidelink power control.

4. The apparatus of claim 2, wherein the instructions are further executable by the processor to cause the apparatus to:
    transmit a sidelink medium access control-control element comprising one or both of the sidelink transmission configuration indicator and the sidelink power control.

5. The apparatus of claim 1, wherein to transmit to the second device configured to be connected to the first device the sidelink pathloss reference signal is based at least in part on a transmit power value for the sidelink pathloss reference signal.

6. The apparatus of claim 5, wherein the instructions are further executable by the processor to cause the apparatus to:
    transmit an indication of the transmit power value for the sidelink pathloss reference signal.

7. The apparatus of claim 6, wherein the instructions to transmit the indication of the transmit power value for the sidelink pathloss reference signal are executable by the processor to cause the apparatus to:
    transmit a sidelink control information indicating the transmit power value for the sidelink pathloss reference signal.

8. The apparatus of claim 1, wherein the instructions are further executable by the processor to cause the apparatus to:
    transmit sidelink control information from the first device configured to be connected to the second device,
    wherein the sidelink transmission configuration indicator and a sidelink power control is based at least in part on a transmission configuration indicator codepoint associated with the sidelink control information.

9. The apparatus of claim 8, wherein a quantity of sidelink transmission configuration indicator states selectable in accordance with the transmission configuration indicator codepoint associated with the sidelink control information is based at least in part on a sidelink radio resource control configuration.

10. The apparatus of claim 1, wherein the sidelink transmission configuration indicator comprises a set of sidelink power control identifiers, and a sidelink power control comprises a set of sidelink power control identifiers, each of one or more sidelink power control identifiers of the set of sidelink power control identifiers is associated with a respective set of sidelink power control parameters.

11. The apparatus of claim 10, wherein the instructions are further executable by the processor to cause the apparatus to:
select the sidelink power control identifier and the respective set of sidelink power control parameters based at least in part on a sidelink medium access control-control element or sidelink control information, or both.

12. The apparatus of claim 11, wherein the sidelink medium access control-control element is irrespective of the sidelink pathloss reference signal identifier.

13. The apparatus of claim 1, wherein the instructions are further executable by the processor to cause the apparatus to:
associate each of one or more sidelink pathloss reference signal identifiers or each of one or more sidelink power control identifiers with the sidelink transmission configuration indicator based at least in part on a sidelink medium access control-control element.

14. The apparatus of claim 1, wherein the sidelink transmission configuration indicator comprises a sidelink transmission configuration indicator state identifier, or a quasi-colocation information type, or both.

15. The apparatus of claim 1, wherein the sidelink transmission configuration indicator is applicable to a forward link between the first device and the second device or a reverse link between the second device and the first device, or both, and the sidelink transmission configuration indicator is applicable to one or more of a physical sidelink control channel (PSCCH), a physical sidelink shared channel (PSSCH), or a physical sidelink feedback channel (PSFCH).

16. An apparatus for wireless communication at a first device, comprising:
a processor;
memory coupled with the processor; and
instructions stored in the memory and executable by the processor to cause the apparatus to:
receive a sidelink pathloss reference signal from a second device configured to be connected to the first device;
associate the sidelink pathloss reference signal to a sidelink transmission configuration indicator and a sidelink power control, wherein the sidelink transmission configuration indicator comprises a sidelink pathloss reference signal identifier, or a sidelink power control identifier, and wherein the sidelink power control comprises the sidelink power control identifier and a set of sidelink power control parameters;
determine a transmit power value for a sidelink beam of the first device based at least in part on the associating; and
perform sidelink communication on the sidelink beam in accordance with the transmit power value for the sidelink beam.

17. The apparatus of claim 16, wherein the instructions are further executable by the processor to cause the apparatus to:
receive control signaling comprising one or both of the sidelink transmission configuration indicator or the sidelink power control.

18. The apparatus of claim 17, wherein the instructions to receive the control signaling are executable by the processor to cause the apparatus to:
receive a sidelink radio resource control message comprising one or both of the sidelink transmission configuration indicator and the sidelink power control.

19. The apparatus of claim 17, wherein the instructions to receive the control signaling are executable by the processor to cause the apparatus to:
receive a sidelink medium access control-control element comprising one or both of the sidelink transmission configuration indicator and the sidelink power control.

20. The apparatus of claim 16, wherein to receive the sidelink pathloss reference signal from the second device configured to be connected to the first device is based at least in part on a transmit power value for the sidelink pathloss reference signal.

21. The apparatus of claim 20, wherein the instructions are further executable by the processor to cause the apparatus to:
receive an indication of the transmit power value for the sidelink pathloss reference signal.

22. The apparatus of claim 21, wherein the instructions to receive the indication of the transmit power value for the sidelink pathloss reference signal are executable by the processor to cause the apparatus to:
receive sidelink control information indicating the transmit power value for the sidelink pathloss reference signal.

23. The apparatus of claim 16, wherein the instructions are further executable by the processor to cause the apparatus to:
receive sidelink control information from the second device configured to be connected to the first device, wherein the sidelink transmission configuration indicator and the sidelink power control is based at least in part on a transmission configuration indicator codepoint associated with the sidelink control information.

24. The apparatus of claim 23, wherein a quantity of sidelink transmission configuration indicator states selectable in accordance with the transmission configuration indicator codepoint associated with the sidelink control information is based at least in part on a sidelink radio resource control configuration.

25. The apparatus of claim 16, wherein the sidelink transmission configuration indicator comprises a set of sidelink power control identifiers, and the sidelink power control comprises the set of sidelink power control identifiers, and each of one or more sidelink power control identifiers of the set of sidelink power control identifiers is associated with a respective set of sidelink power control parameters.

26. The apparatus of claim 25, wherein the sidelink power control identifier and the set of sidelink power control parameters is based at least in part on a sidelink medium access control-control element or sidelink control information, or both.

27. The apparatus of claim 26, wherein the instructions are further executable by the processor to cause the apparatus to:
associate each of one or more sidelink pathloss reference signal identifiers or each of one or more sidelink power control identifiers with the sidelink transmission configuration indicator based at least in part on a sidelink medium access control-control element.

28. The apparatus of claim 27, wherein the sidelink medium access control-control element is irrespective of the sidelink pathloss reference signal identifier.

29. A method for wireless communication at a first device, comprising:
selecting a sidelink beam for a second device configured to be connected to the first device based at least in part on a sidelink transmission configuration indicator, wherein the sidelink transmission configuration indicator comprises a sidelink pathloss reference signal identifier, or a sidelink power control identifier, or both; and transmitting a sidelink pathloss reference signal to the second device configured to be connected to the first device, wherein the sidelink pathloss reference signal is associated with the sidelink pathloss reference signal identifier of the sidelink transmission configuration indicator.

30. A method for wireless communication at a first device, comprising:

receiving a sidelink pathloss reference signal from a second device configured to be connected to the first device;

associating the sidelink pathloss reference signal to a sidelink transmission configuration indicator and a sidelink power control, wherein the sidelink transmission configuration indicator comprises a sidelink pathloss reference signal identifier, or a sidelink power control identifier, or both, and wherein the sidelink power control comprises the sidelink power control identifier and a set of sidelink power control parameters;

determining a transmit power value for a sidelink beam of the first device based at least in part on the associating; and performing sidelink communication on the sidelink beam in accordance with the transmit power value for the sidelink beam.

* * * * *